United States Patent
Liu et al.

(10) Patent No.: US 12,169,882 B2
(45) Date of Patent: Dec. 17, 2024

(54) LEARNING DENSE CORRESPONDENCES FOR IMAGES

(71) Applicant: NVIDIA Corporation, Santa Clara, CA (US)

(72) Inventors: Sifei Liu, Santa Clara, CA (US); Jiteng Mu, La Jolla, CA (US); Shalini De Mello, San Francisco, CA (US); Zhiding Yu, Santa Clara, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 245 days.

(21) Appl. No.: 17/929,182

(22) Filed: Sep. 1, 2022

(65) Prior Publication Data

US 2023/0252692 A1    Aug. 10, 2023

Related U.S. Application Data

(60) Provisional application No. 63/306,773, filed on Feb. 4, 2022.

(51) Int. Cl.
*G06T 11/00* (2006.01)
*G06T 3/18* (2024.01)

(52) U.S. Cl.
CPC .............. *G06T 11/001* (2013.01); *G06T 3/18* (2024.01)

(58) Field of Classification Search
None
See application file for complete search history.

(56) References Cited

U.S. PATENT DOCUMENTS

5,155,706 A * 10/1992 Haley ................. G01S 15/8902
367/7
8,630,454 B1 * 1/2014 Wang ..................... G06T 7/269
382/103

(Continued)

OTHER PUBLICATIONS

Alharbi, Y., et al., "Disentangled Image Generation Through Structured Noise Injection," In CVPR, pp. 5133-5141, 2020.

(Continued)

*Primary Examiner* — Jason A Pringle-Parker
(74) *Attorney, Agent, or Firm* — Leydig, Voit & Mayer, Ltd.

(57) ABSTRACT

Embodiments of the present disclosure relate to learning dense correspondences for images. Systems and methods are disclosed that disentangle structure and texture (or style) representations of GAN synthesized images by learning a dense pixel-level correspondence map for each image during image synthesis. A canonical coordinate frame is defined and a structure latent code for each generated image is warped to align with the canonical coordinate frame. In sum, the structure associated with the latent code is mapped into a shared coordinate space (canonical coordinate space), thereby establishing correspondences in the shared coordinate space. A correspondence generation system receives the warped coordinate correspondences as an encoded image structure. The encoded image structure and a texture latent code are used to synthesize an image. The shared coordinate space enables propagation of semantic labels from reference images to synthesized images.

20 Claims, 16 Drawing Sheets

(56) References Cited

U.S. PATENT DOCUMENTS

| | | | | |
|---|---|---|---|---|
| 2013/0307931 | A1* | 11/2013 | Bronstein | H04N 13/161 348/43 |
| 2019/0312772 | A1* | 10/2019 | Zhao | G06F 9/5011 |
| 2020/0167943 | A1* | 5/2020 | Kim | G06T 7/579 |
| 2021/0192279 | A1* | 6/2021 | Laaksonen | G16H 30/20 |
| 2022/0343601 | A1* | 10/2022 | Liaudanskas | G06V 10/774 |

OTHER PUBLICATIONS

Anokhin, I., et al., "Image Generators With Conditionally-Independent Pixel Synthesis," In CVPR, pp. 14278-14287, 2021.
Brock, A., et al., "Large Scale Gan Training for High Fidelity Natural Image Synthesis," arXiv preprint arXiv:1809.11096, 2018.
Chan, E., et al., "pi-GAN: Periodic Implicit Generative Adversarial Networks for 3D-Aware Image Synthesis," In CVPR, pp. 5799-5809, 2021.
Chen, X., et al., "InfoGAN: Interpretable Representation Learning by Information Maximizing Generative Adversarial Nets," In NeurIPS, pp. 2172-2180, 2016.
Choi, Y., et al., "StarGAN: Unified Generative Adversarial Networks for Multi-Domain Image-to-Image Translation," In CVPR, pp. 8789-8797, 2018.
Choy,C., et al., "Universal Correspondence Network," arXiv preprint arXiv:1606:03558, 2016.
Deng, J., et al., "Imagenet: A Large-Scale Hierarchical Image Database," In CVPR, pp. 248-255, 2009.
Deng, J., et al., "ArcFace: Additive Angular Margin Loss for Deep Face Recognition," In CVPR, pp. 4690-4699, 2019.
Gatys, L., et al., "Image Style Transfer Using Convolutional Neural Networks," In CVPR, pp. 2414-2423, 2016.
Han, K., et al., "SCNet: Learning Semantic Correspondence," In ICCV, pp. 1831-1840, 2017.
Harkonen, E., et al., "GANSpace: Discovering Interpretable GAN Controls," arXiv preprint arXiv:2004.02546, 2020.
He, K., et al., "Momentum Contrast for Unsupervised Visual Representation Learning," In CVPR, pp. 9726-9735, 2020.
He, K. et al., "Deep Residual Learning for Image Recognition," In CVPR, pp. 770-778, 2016.
Heusel, M., et al., "GANS Trained by a Two-Time Scale Update Rule Converge to a Local Nash Equilibrium," In NeurIPS, pp. 6626-6637, 2017.
Jaderberg, M., et al., "Spatial Transformer Networks," NeurIPS, 28:2017-2025, 2015.
Jeon, S., et al., "PARN: Pyramidal Affine Regression Networks for Dense Semantic Correspondence," In ECCV, pp. 351-366, 2018.
Johnson, J., et al., "Perceptual Losses for Real-Time Style Transfer and Super-Resolution," In ECCV, pp. 694-711, 2016.
Kanazawa, A., et al., "Learning Category-Specific Mesh Reconstruction From Image Collections," In ECCV, pp. 371-386, 2018.
Karras, T., et al., "Progressive Growing GANS for Improved Quality, Stability and Variation," arXiv preprint arXiv:1710.10196, 2017.
Karras, T., et al., "A Style-Based Generator Architecture for Generative Adversarial Networks," In CVPR, pp. 4401-4410, 2019.
Kay, W., et al., "The Kinetics Human Action Video Dataset," CoRR, abs/1705.06950, 2017.
Karras, T., et al., "Analyzing and Improving the Image Quality of Stylegan," arXIV:1912.04958v2, Mar. 23, 2020.
Kim, S., et al., "FCSS: Fully Convolutional Self-Similarity for Dense Semantic Correspondence," In CVPR, pp. 616-625, 2017.
Krause, J., et al., "3D Object Representations for Fine-Grained Categorization," In ICCVW, Sydney, AU, 2013.
Kulkarni, N., et al., "Canonical Surface Mapping Via Geometric Cycle Consistency," In ICCV, pp. 2202-2211, 2019.
Kwon, G., et al., "Diagonal Attention and Style-Based GAN for Content-Style Disentanglement in Image Generation and Translation," In ICCV, pp. 13980-13989, 2021.
Lee, C.H., et al., "MaskGAN: Towards Diverse and Interactive Facial Image Manipulation," In CVPR, 2020.
Li, X., et al., "Joint-Task Self-Supervised Learning for Temporal Correspondence," arXiv preprint arXiv:1909.11895, 2019.
Li, X., et al., "Self-Supervised Single-View 3D Reconstruction Via Semantic Consistency," In ECCV, pp. 677-693, Springer 2020.
Liu, Y., et al., "Semantic Correspondence as an Optimal Transport Problem," In CVPR, pp. 4462-4471, 2020.
Nguyen-Phuoc, T., et al., "HoloGAN: Unsupervised Learning of 3D Representations from Natural Images," In ICCV, pp. 7587-7596, 2019.
Ojha, U., et al., "Generating Furry Cars: Disentangling Object Shape and Appearance Across Multiple Domains," In ICLR, 2021.
Park, T., et al., "Swapping Autoencoder for Deep Image Manipulation," arXiv preprint arXiv:2007-00653, 2020.
Radford, A., et al., "Unsupervised Representation Learning with Deep Convolutional Generative Adversarial Networks," arXiv preprint arXiv:1511.06434, 2015.
Richardson, E., et al., "Encoding in Style: A Stylegan Encoder for Image-to-Image Translation," In CVPR, pp. 2287-2296, 2021.
Rocco, I., et al., "Convolutional Neural Network Architecture for Geometric Matching," In CVPR, pp. 6148-6157, 2017.
Shen, Y., et al., "Interpreting the Latent Space of GANS for Semantic Face Editing," In CVPR, pp. 9243-9252, 2020.
Shen, Y., et al., "Closed-Form Factorization of Latent Semantics in GANS," In CVPR, pp. 1532-1540, 2021.
Singh, K., et al., "FineGAN: Unsupervised Hierarchical Disentanglement for Fine-Grained Object Generation and Discovery," In CVPR, pp. 6490-6499, 2019.
Ulyanov, D., et al., "Texture networks: Feed-Forward Synthesis of Textures and Stylized Images," In ICML, pp. 1349-1357, 2016.
Wang, X., et al., "Non-Local Neural Networks," In CVPR, pp. 7794-7803, 2018.
Xiao, T., et al., "Learning Contrastive Representation for Semantic Correspondence," arXiv preprint arXiv:2109.10967, 2021.
Xu, J., et al., "Rethinking Self-Supervised Correspondence Learning: A Video Frame-Level Similarity Perspective," arXiv preprint arXiv:2103.17263, 2021.
Xu, J., et al., "Linear Semantics in Generative Adversarial Networks," in CVPR, pp. 9351-9360, 2021.
Yang, C., et al., "Semantic Hierarchy Emerges in Deep Generative Representations for Scene Synthesis," IJCV, pp. 1451-1466, 2021.
Zhang, R., et al., "The Unreasonable Effectiveness of Deep Features as a Perceptual Metric," in CVPR, pp. 586-595, 2018.
Zhang, Y., et al., "DatasetGAN: Efficient Labeled Data Factory With Minimal Human Effort," In CVPR, pp. 10145-10155, 2021.

* cited by examiner

LEARNING DENSE CORRESPONDENCES FOR IMAGES

CLAIM OF PRIORITY

This application claims the benefit of U.S. Provisional Application No. 63/306,773 titled "Self-Supervised Dense Correspondences Emerge from GANs," filed Feb. 4, 2022, the entire contents of which is incorporated herein by reference.

BACKGROUND

Generative adversarial neural networks (GANs) have been developed to synthesize realistic images with varying structure and texture. The structure defines shapes of components of an object within an image, such as a nose, ear, eyebrow, etc. of a human face or wheels, headlights, etc. of a vehicle. The texture defines appearance details that are independent of the structure, such as hair color, skin tone, feature color, etc.

Conventional GANs can synthesize images with smooth variations along semantically meaningful latent directions, such as pose, expression, layout, etc. While the ability to synthesize smooth variations indicates that the GANs implicitly learn pixel-level correspondences across images, few studies explore how to extract the pixel-level correspondences explicitly. There is a need for addressing these issues and/or other issues associated with the prior art.

SUMMARY

Embodiments of the present disclosure relate to learning dense correspondences for images. Systems and methods are disclosed that disentangle structure and texture (or style) representations of GAN synthesized images by learning a dense pixel-level correspondence map for each image during image synthesis. A canonical coordinate frame is defined and a structure latent code is generated to warp the canonical coordinate frame to align with an internal structure of the synthesized image. In other words, the structure associated with the latent code is mapped into a shared coordinate space), thereby establishing correspondences in the shared coordinate space (canonical coordinate space). A Coordinate GAN (CoordGAN) correspondence generation system receives the warped coordinate correspondences as an encoded image structure. The encoded image structure and an encoded image texture (texture latent code) are used to synthesize an image.

The coordGAN is trained by encouraging disentanglement of the latent space so that the structure and the texture are separately controlled by the structure and texture image encodings, respectively. A swapping constraint is used to ensure that the coordGAN synthesizes images with consistent structure when the encoded structure is unchanged and different encoded textures are used. Similarly, a swapping constraint may also be used to learn consistent textures and to regularize the local texture statistics to be similar between two synthesized images with different structures. In an embodiment, a patch GAN may process the two synthesized images to regularize the local texture statistics.

Studies show that disentanglement of semantic attributes can be achieved by carefully searching for latent directions learned by GANs, but all attributes being factorized must be identified by humans which is very time-consuming. Some recent advances demonstrate effective structure-texture disentanglement by improving the noise code input to GANs, or by applying spatial attention in the intermediate layers. However, these disentanglement techniques either produce a relatively low resolution (e.g., 4×4) structure map, or do not produce explicitly produce a structure map.

In contrast to conventional systems, such as those described above, the coordGAN achieves better disentanglement as a result of the shared coordinate space representation. The dense correspondence can be explicitly extracted from the coordinate space representation. Specifically, a parametrized warping function conducts conditional warping on individual instances, while preserving the smoothness of the standard coordinate map. The CoordGAN generates dense correspondence maps and high-quality images and can be flexibly equipped with an encoder to produce the correspondence maps for real images. The encoder learns explicit structure representation and may be used to perform semantic label propagation from a reference image to the generated images.

In an embodiment, the method of generating correspondences for images, comprises warping a shared coordinate map, according to transformation parameters, to align with an encoded structure to produce a correspondence map for an image and synthesizing, by a modulated generator using generator parameters, the image according to the correspondence map and an encoded texture. In an embodiment, an object in the image comprises appearance details according to the encoded texture and component shapes controlled by the encoded structure.

BRIEF DESCRIPTION OF THE DRAWINGS

The present systems and methods for learning dense correspondences for images are described in detail below with reference to the attached drawing figures, wherein.

DETAILED DESCRIPTION

Systems and methods are disclosed related to learning dense correspondences for images. The dense correspondence maps of different images may be represented as warped coordinate frames transformed from a canonical coordinate map. The warped coordinate frame comprises a correspondence map which describes the structure or unique geometry (e.g., the shape of a face). Conceptually, finding correspondences is locating the same coordinate in different correspondence maps. In CoordGAN, a transformation is sampled to represent the structure of a synthesized instance, while an independent texture (style) branch is responsible for rendering appearance details (e.g., color and textures) that are orthogonal to the structure. Dense correspondence maps may also be extracted for real images by adding an encoder on top of the generator. Given a set of images from one category, the goal of CoordGAN is to disentangle the structure and the style representations, in both a pure generative model, and the encoder that receives an input image.

Figure 1A:
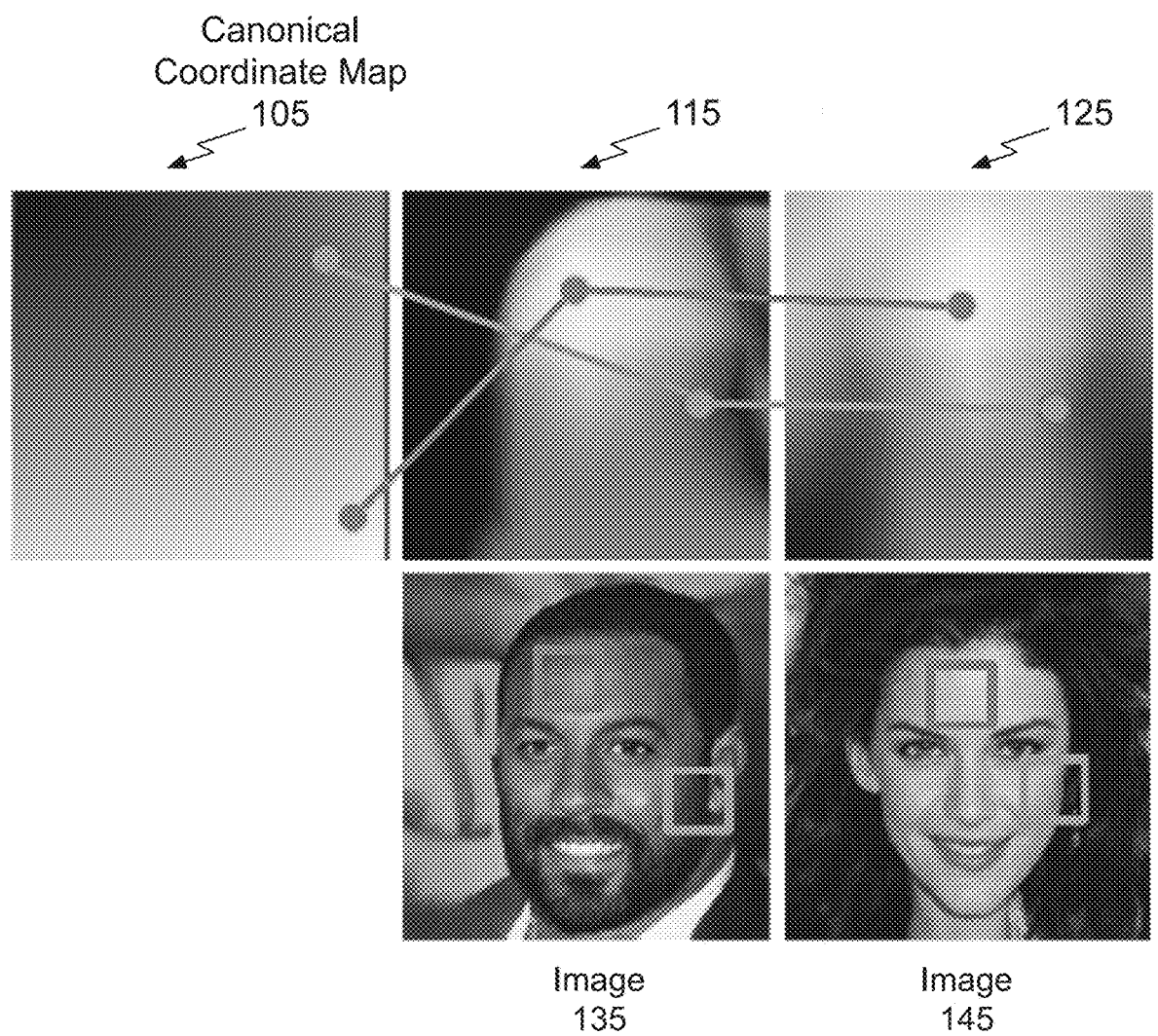
FIG. 1A illustrates dense correspondence maps generated by a correspondence generation system, in accordance with an embodiment.

FIG. 1A illustrates dense correspondence maps 115 and 125 generated by a correspondence generation system, in accordance with an embodiment. In an embodiment, the correspondence generation system comprises CoordGAN. In an embodiment, images 135 and 145 are synthesized images generated by the correspondence generation system. Dense correspondence maps 115 and 125 are generated by the correspondence generation system for the images 135 and 145, respectively. Specifically, pixel-level structural correspondences are indicated within forehead and cheek regions for the images 135 and 145. Locations of the pixel-level structural correspondences are transformed into a canonical coordinate map 105. The dense correspondence map 115 establishes correspondences between the image 135 and the canonical coordinate map 105. The dense correspondence map 125 establishes correspondences between the image 145 and the canonical coordinate map 105. The dense correspondence maps 115 and 125 may be useful for transferring properties between the images 135 and 145, such as semantic labels, landmark locations, image pixels, and the like.

The images 135 and 145 are synthesized from latent codes or vectors in a latent space. Moving latent codes along a semantically meaningful direction (e.g., pose) generates instances with smoothly varying appearance (e.g., continually changing viewpoints), implying that GANs also implicitly learn which pixels or regions are in correspondence with each other, from different synthesized instances. On the other hand, dense correspondence is established between local semantically-similar regions, but with varying appearance (e.g., patches of two different eyes). Learning dense correspondence across images of one category remains challenging because labeling large-scale, pixel-level annotations is extremely laborious.

In contrast with conventional GANs that synthesize images, CoordGAN learns an explicit correspondence map, i.e., a pixel-level semantic label map. Since correspondence represents structure (e.g., shapes of facial components) and is independent of texture (e.g., global appearance like skin tone and texture), learning correspondence maps is highly relevant to disentanglement of structure and texture in GANs. Identifying dense correspondence has been a challenging problem due to large shape and appearance variances. Studies show that disentanglement of semantic attributes can be achieved by carefully searching for latent directions learned by GANs, but all attributes being factorized must be identified by humans and labeled. Advantageously, CoordGAN learns to extract dense correspondence without using any annotated labels.

The canonical coordinate map 105 provides a coordinate space, from which pixel-level correspondence can be explicitly obtained for all the synthesized images of a category. The dense correspondence map, such as the dense correspondence map 115 or 125, of a generated image is represented as a warped coordinate frame transformed from a canonical 2D coordinate map, such as the canonical coordinate map 105. Therefore, a unique structure may be represented as a transformation between the warped and the canonical frames. The CoordGAN correspondence generation system is designed with structure and texture controlled via two independently sampled noise vectors. While the texture branch controls the global appearance via Adaptive Instance Normalization (AdaIN), in the structure branch, a multilayer perceptron (MLP) is learned as the transformation. A sampled noise vector is mapped to a warped coordinate frame, which is further modulated in a generator to control the structure of the synthesized image in a hierarchical manner. CoordGAN models finer structure compared with conventional techniques, allowing generation of images having the same identity with various textures, such as is done for style transfer. Style transfer synthesizes a novel image by combining the content of one image with the texture of another one.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
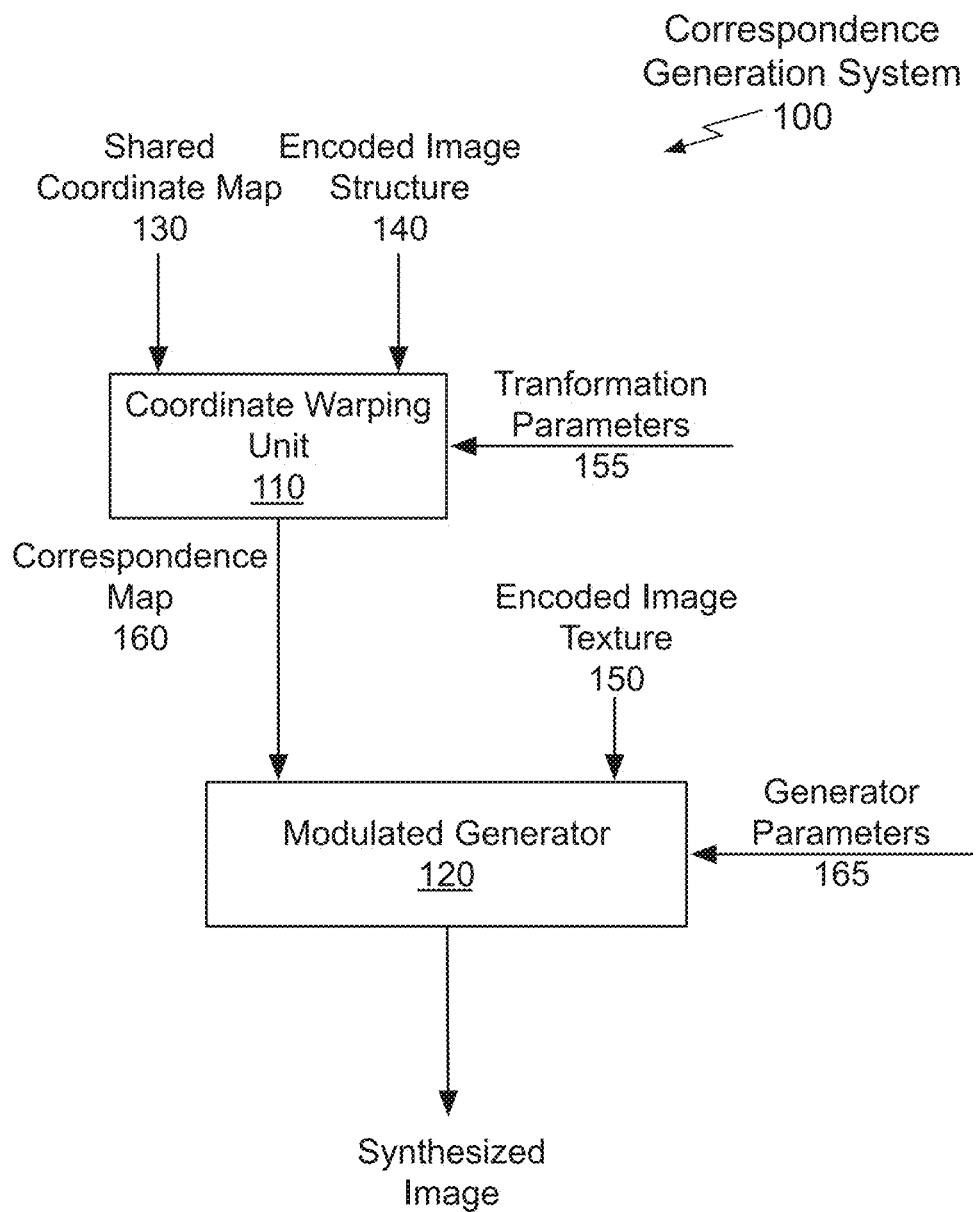
FIG. 1B illustrates a block diagram of an example correspondence generation system suitable for use in implementing some embodiments of the present disclosure.

FIG. 1B illustrates a block diagram of an example correspondence generation system 100 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the correspondence generation system 100 is within the scope and spirit of embodiments of the present disclosure.

A shared coordinate map 130 (canonical coordinate map) is defined and an encoded image structure 140 (structure latent code) for each generated image is utilized along with the shared coordinate map 130 to warp the shared coordinate map 130 to a correspondence map 160. In other words, the structure associated with the structure latent code controls warping of a coordinate space that is shared by the generated images to an individual correspondence map 160. The encoded image structure 140 and an encoded image texture 150 are used by the correspondence generation system 100 to synthesize an image.

The correspondence generation system 100 includes a coordinate warping unit 110 and a modulated generator 120. The encoded image structure 140 and encoded image texture 150 (i.e., sampled texture and structure codes) may be generated from a latent structure vector and a latent texture vector, respectively. In an embodiment, the encoded image structure 140 is generated from a latent structure vector by a structure map neural network (not shown). In an embodiment, the encoded image texture 150 is generated from a latent texture vector by a texture map neural network (not shown). Learned parameters used by the structure and texture map neural networks are trained along with transformation parameters 155 used by the coordinate warping unit 110 and generator parameters 165 used by the modulated generator 120. In an embodiment, the same shared coordinate map 130 is used for all images within a single category (e.g., faces, human bodies, cars, cats, etc.).

The coordinate warping unit 110 comprises a multilayer perceptron (MLP) that processes the shared coordinate map 130 and the encoded image structure 140 (structure latent code $w_s$) according to the learned transformation parameters 155 to produce the correspondence map 160. The modulated generator 120 processes the correspondence map 160 and the encoded image texture 150 (texture latent code $w_t$) according to the learned generator parameters 165. In an embodiment, the correspondence map 160 is converted via a positional encoding layer for input to a first layer of the modulated generator 120. The correspondence map 160 may also be directly combined with features output by one or more subsequent layers of the modulated generator 120. In an embodiment, the encoded image texture 150 is also input to each layer of the modulated generator 120 via weight modulation to render appearance details at various levels (fine, coarse).

A coordinate map C is defined as a 2D coordinate map of width $W^c$ and height $H^c$. $C(i,j)=(i,j)$ denotes the canonical coordinate map or the shared coordinate map 130. Pixel locations and coordinates are normalized to the range $[-1,1]$. For example, $C(1,1)=(1,1)$ indicates the bottom right pixel of the coordinate map is coordinate $(1,1)$. It is then possible to define a warping function $\mathcal{W}: (C,w) \to C^w$, parameterized by a code $w \in \mathbb{R}^N$, that maps C into a warped coordinate map $C^w$ or the correspondence map 160. Since the code w relates the pixel coordinates of the image to the canonical coordinate map, it can be seen as the representation of image structure, the encoded image structure 140. In particular, $C^w(i,j)=(k,l)$ implies that the pixel i,j of the image is in correspondence with the canonical coordinate k,l. Given two images with codes $w_1$ and $w_2$, it is also possible to establish correspondence between the two images by seeking pixels of similar coordinates. Given pixel (i,j) of the image associated with coordinate $C^{w_1}(i,j)$, the corresponding pixel in another image of coordinate map $C^{w_2}$ is, $$T_{1,2}(i,j) = \arg\min_{p,q} \|C^{w_1}(i,j) - C^{w_2}(p,q)\|^2, \qquad \text{Eq. (1)}$$

where $T_{1,2}$ defines the forward transformation from warped coordinates $C^{w_1}$ to $C^{w_2}$. In this way, the correspondence generation system 100 for images that includes the coordinate warping unit 110 automatically establishes dense correspondence between all synthesized images, as shown in FIG. 1A. The dense correspondence maps 160 can be useful for transferring properties, such as semantic labels, landmark locations, image pixels, and the like, between images.

In an embodiment, the encoded image structure 140 and encoded image texture 150 inputs to the correspondence generation system 100 are generated from two latent vectors with dimension N: a structure vector $z_s \in \mathcal{R}^N$ for modeling layouts and object structure, and a latent texture vector $z_t \in \mathcal{R}^N$ for modeling texture, lighting, etc. A function $G(z_s, z_t; \theta_G)$ provides a mapping from the latent vectors (used to produce the encoded image structure 140 and the encoded image texture 150) to the image space, with parameters $\theta_G$. The mapping is implemented by a combination of structure and texture mappings. A structure mapping neural network $w_s = S(z_s; \theta_s)$ applies parameters $\theta_s$ to map the structure noise variable $z_s$ into a structure code $w_s$ (the encoded image structure 140), which is then used by a warping function $\mathcal{W}(C, w_s)$ implemented by the coordinate warping unit 110 to produce a warped coordinate map (the correspondence map 160) $C^{w_s}$ for the image. A texture mapping neural network $w_t = \mathcal{T}(z_t; \theta_T)$ applies parameters $\theta_T$ to map the texture noise variable $z_t$ into a texture code $w_t$ (the encoded image texture 150). The modulated generator 120 then produces an image with the mapping $\mathcal{A}$ parameterized by the generator parameters 165 $\theta_\mathcal{A}$, $$G(z_s, z_t, \theta_G) = \mathcal{A}(C^{w_s}, w_t, \theta_\mathcal{A}), \qquad \text{Eq. (2)}$$

where $\theta_G$ includes $\theta_s$, $\theta_T$, and $\theta_\mathcal{A}$.

Figure 1C:
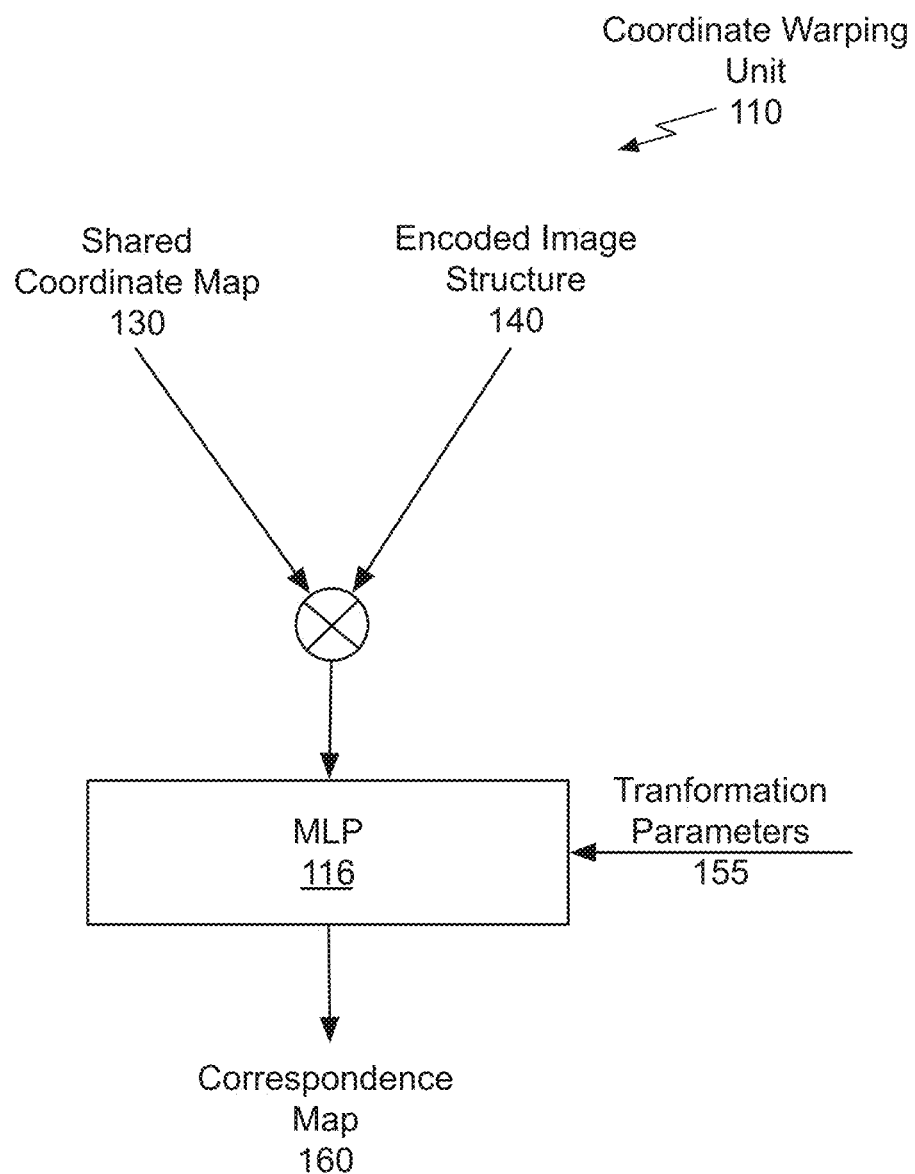
FIG. 1C illustrates a block diagram of an example coordinate warping unit shown in FIG. 1B suitable for use in implementing some embodiments of the present disclosure.

FIG. 1C illustrates a block diagram of an example coordinate warping unit 110 shown in FIG. 1B suitable for use in implementing some embodiments of the present disclosure. The coordinate warping unit 110 learns a transformation between the shared coordinate map 130 and a warped coordinate frame, conditioned on the encoded image structure 140 (latent structure code $w_s$). While there exist several differentiable transformation functions, such as Thin Plate Splines (TPS), Spatial Transformation Network (STN), and affinity matrix. The transformation may be implemented with MLP 116 as $$C^{w_s}(i,j) = \mathcal{W}(C(i,j), w_s) = \mathcal{P}([C(i,j), w_s], \theta_\mathcal{P}) \forall i,j \qquad \text{Eq. (3)}$$

where $\mathcal{P}$ is a three layer MLP 116 of parameters $\theta_\mathcal{P}$ and $[C(i,j), w_s] \in \mathcal{R}^{N+2}$ is the concatenation of coordinate i,j from the canonical coordinate frame with the encoded image structure 140 as $w_s$.

As shown in FIG. 1C, the shared coordinate map 130 is defined in two dimensions and the two coordinates i,j are concatenated with the N dimension encoded image structure 140 to produce an N+2 dimension input to an MLP 116. The coordinates i,j are input to produce warped coordinates defining the correspondence map 160. In sum, the MLP 116 is a learnable, conditional geometric transformation between the shared coordinate map 130 and the correspondence map 160. There are at least two advantages of learning the transformation via the MLP 116. First, because an MLP is a continuous function containing only linear projection layers and ReLUs, it preserves the order of the coordinates in the shared coordinate map 130, i.e., it ensures that the warping is diffeomorphic. Second, compared to TPS and STN, the design of $\mathcal{W}$ is generic and allows for more flexible deformation.

Figure 1D:
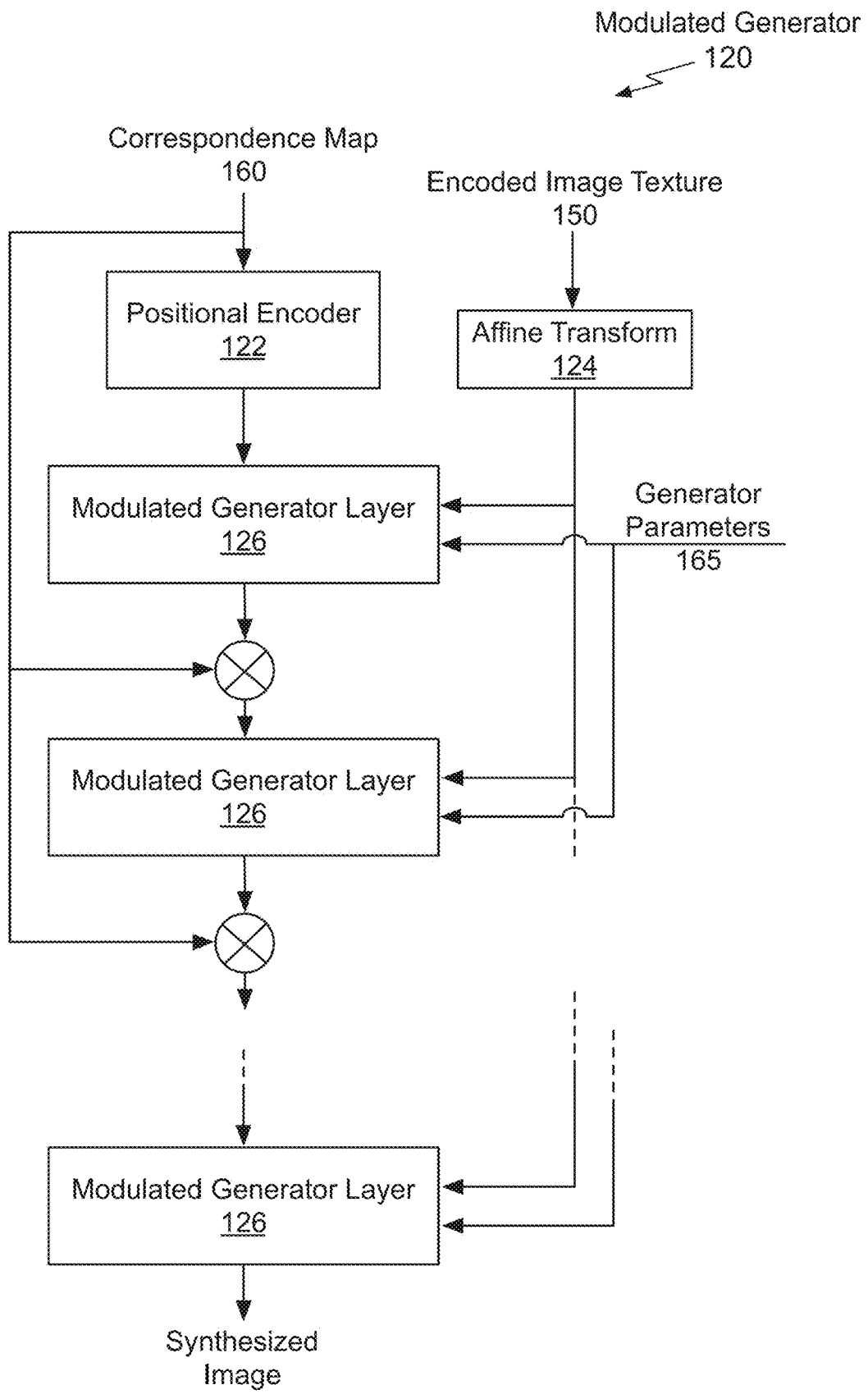
FIG. 1D illustrates a block diagram of an example modulated generator shown in FIG. 1B suitable for use in implementing some embodiments of the present disclosure.

FIG. 1D illustrates a block diagram of an example modulated generator 120 shown in FIG. 1B suitable for use in implementing some embodiments of the present disclosure. The design of the modulated generator 120 is inspired by StyleGAN as described by Tero Karras, Samuli Laine, and Timo Aila in "A Style-based Generator Architecture for Generative Adversarial Networks," In CVPR, pages 4401-4410, 2019, the entire contents of which is incorporated herein by reference. The learnable constant input to StyleGAN is replaced with the correspondence map 160. However, rather than inputting the correspondence map 160 directly to a first modulated generator layer 126, as shown in FIG. 1D, the correspondence map 160 is mapped via a positional encoder 122. In an embodiment, the positional encoder 122 applies a 1×1 convolution followed by a sine function to obtain a Fourier embedding. In contrast with StyleGAN, two independent mapping neural networks (e.g., a texture mapping neural network and a structure mapping neural network) may be used to generate the encoded image texture 150 and the encoded image structure 140.

Because the correspondence map 160 is higher resolution (i.e., 128×128) compared with StyleGAN's learned constant, instead of gradually increasing spatial resolution, in an embodiment, the spatial resolution is kept the same as the input Fourier embedding at all modulated generator layers 126. The encoded image texture 150 may be processed by an affine transform 124 and input to different modulated generator layers 126 of the modulated generator 120. In an embodiment, the encoded image texture 150 is applied as weights and the affine transform 124 modulates the encoded image texture 150 to render appearance details at different levels of the modulated generator 120. To balance the encoded image structure and texture 140 and 150 inputs at an architectural level, the dense correspondence map 160 is also concatenated with the features produced by with one or more of the multiple intermediate modulated generator layers 126. In an embodiment, the Fourier embedding and the features output by each modulated generator layer 126 are H×W×C and after concatenation with the dense correspondence map 160, the input to each subsequent modulated generator layer 126 is H×W×(C+2). In an embodiment, without the multi-layer modulation of the correspondence map 160, the coordinate warping unit 110 (specifically, the MLP 116) may only learn coarse and inaccurate structure information (e.g., viewpoints of faces).

The correspondence generation system 100 is trained by encouraging disentanglement of the latent space so that the structure and the texture are separately controlled by the encoded image structure 140 and the encoded image texture 150, respectively. A swapping constraint may be used to ensure that the correspondence generation system 100 synthesizes images with consistent structure when the encoded image structure 140 is unchanged and different encoded image textures 150 are used. Similarly, a swapping constraint may also be used to learn consistent textures and to regularize the local texture statistics to be similar between two synthesized images with different structures. In an embodiment, a patch GAN may process the two synthesized images to regularize the local texture statistics using a warping loss.

Figure 2A:
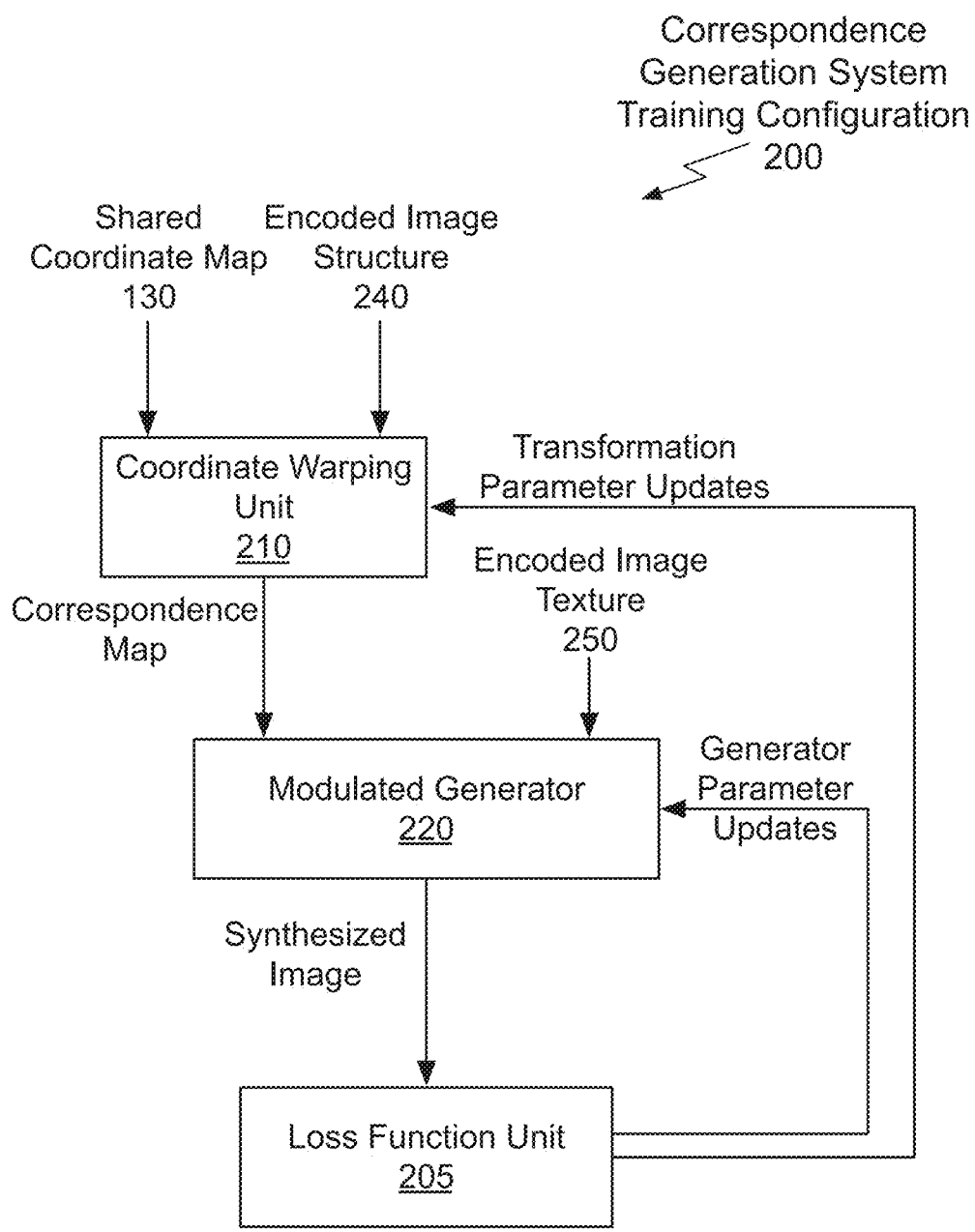
FIG. 2A illustrates a block diagram of an example correspondence generation system training configuration suitable for use in implementing some embodiments of the present disclosure.

FIG. 2A illustrates a block diagram of an example correspondence generation system training configuration 200 suitable for use in implementing some embodiments of the present disclosure. The correspondence generation system training configuration 200 includes a loss function unit 205 and, in an embodiment, training is accomplished in a self-supervised manner using at least the swapping constraints. The correspondence generation system training configuration 200 also includes a coordinate warping unit 210 and a modulated generator 220 that may be implemented as the coordinate warping unit 110 and the modulated generator 120 of the correspondence generation system 100, with transformation and generator parameter values that can be updated. Specifically, parameters of the MLP 116 are updated during training. When the correspondence generation system includes a texture mapping neural network and a structure mapping neural network to produce an encoded image texture 250 and an encoded image structure 240, respectively, parameters for texture mapping neural network and the structure mapping neural network may also be updated during training.

The correspondence generation system may be trained with one or more objectives including a texture swapping constraint, a structure swapping constraint, a warping loss, a Chamfer loss, and a standard GAN objective. The loss function unit 205 evaluates an overall training objective including one or more of the objectives and backpropagates the transformation and generator parameter updates to reduce the loss. The texture swapping constraint is applied to ensure that the correspondence generation system generates the same identity and image layout when the structure is fixed and only the encoded image texture 250 is modified. Given a pair of synthesized images with a shared encoded image structure 240 (derived from the latent structure vector $z_s$) and different encoded image textures 250 (derived from the latent texture vectors $z_{t_1}$, $z_{t_2}$), the texture swapping loss $\mathcal{L}_t$ is defined as the learned perceptual image patch similarity (LPIPS) loss between the two synthesized images:

$$\mathcal{L}_t = \mathcal{L}_{LPIPS}(G(z_s, z_{t_1}; \theta_G), G(z_s, z_{t_2}; \theta_G)). \qquad \text{Eq. (4)}$$

The structure swapping constraint is applied to encourage images that share the same encoded image texture 250 to have similarly looking textures. This consists of encouraging two images with the same encoded image texture 250 (derived from the latent texture vector $z_t$) but different encoded image structure 240 (derived from the latent structure vectors $z_{s_1}$, $z_{s_2}$) to have similar textures. A non-saturating GAN loss based on a patch discriminator may be used to define the structure swapping loss:

$$\mathcal{L}_s = \mathbb{E}[-\log(D_{patch}(G(z_{s_1}, z_t; \theta_G), G(z_{s_2}, z_t; \theta_G)))]. \qquad \text{Eq. (5)}$$

A warping loss is defined to explicitly regularize the correspondence map produced by the coordinate warping unit 210. Given a pair of synthesized images $x_1 = G(z_{s_1}, z_{t_1}; \theta_G)$ and $x_2 = G(z_{s_2}, z_{t_2}; \theta_G)$, $x_1$ is warped to the coordinate frame of $x_2$ by transferring pixel colors according to Equation (1). In practice, Equation (1) may be relaxed with an affinity matrix to make the warping differentiable, producing a warped image $x_{2,1}^w$. A warping loss based on the LPIPS loss $$\mathcal{L}_{warp} = L_{LPIPS}(x_{2,1}^w, x_2), \qquad \text{(Eq. 6)}$$

is used to minimize the distance between $x_{2,1}^w$ and $x_2$.

Suppose a canonical coordinate map C is transformed to a warped coordinate map $C^w$, a Chamfer loss may be implemented to avoid the collapse of the transformation, $$\mathcal{L}_{cham} = \frac{1}{|C|} \sum_{(i,j) \in C} \min_{(p,q)} \|C(i, j) - C^w(p, q)\|_2 + \qquad \text{Eq. (7)}$$

$$\frac{1}{|C^w|} \sum_{(p,q) \in C^w} \min_{(i,j)} \|C^w(p, q) - C(i, j)\|_2.$$

To generate realistic images, a standard GAN objective function $\mathcal{L}_{GAN}$ may be applied to the synthesized images. Combining all the aforementioned loss objectives, the overall training objective is defined as $$\mathcal{L}_G = \lambda_t * \mathcal{L}_t + \lambda_s * 1 \mathcal{L}_s + \lambda_{warp} * \mathcal{L}_{warp} + \lambda_{cham} * \mathcal{L}_{cham} + \lambda_{GAN} * \mathcal{L}_{GAN},$$

where $\lambda_t$, $\lambda_s$, $\lambda_{warp}$, $\lambda_{cham}$, $\lambda_{GAN}$ are coefficients used to balance the different losses.

Figure 2B:
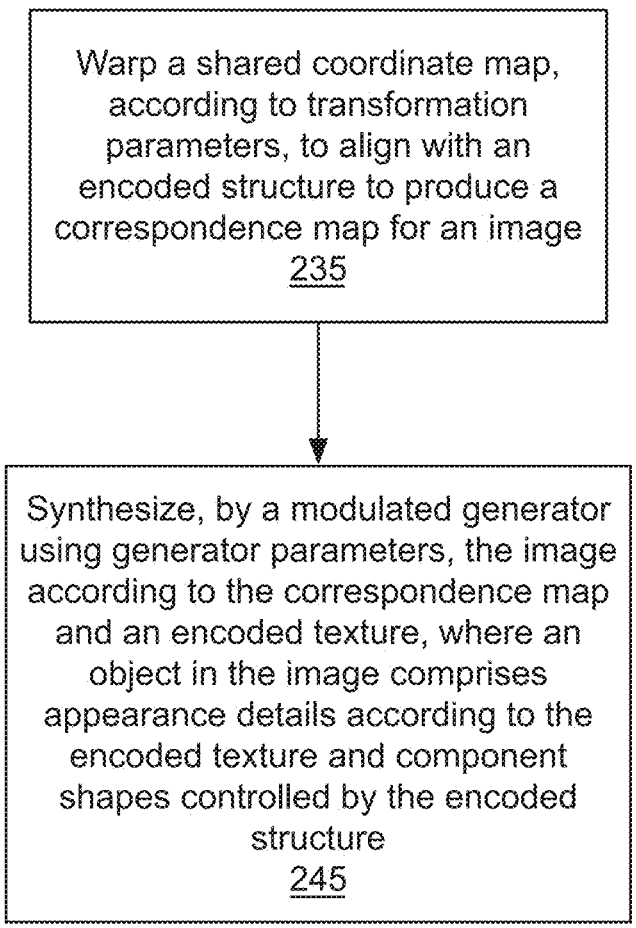
FIG. 2B illustrates a flowchart of a method for dense correspondence generation, in accordance with an embodiment.

FIG. 2B illustrates a flowchart of a method 225 for dense correspondence generation, in accordance with an embodiment. Each block of method 225, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 225 is described, by way of example, with respect to the correspondence generation system 100 of FIG. 1B. However, this method may additionally or alternatively be executed by any one system, or any combination of systems, including, but not limited to, those described herein. Furthermore, persons of ordinary skill in the art will understand that any system that performs method 225 is within the scope and spirit of embodiments of the present disclosure.

At step 235, a shared coordinate map is warped, according to transformation parameters, to align with an encoded structure to produce a correspondence map for an image. In an embodiment, the shared coordinate map and the encoded structure comprise the shared coordinate map 130 and the encoded image structure 140 or 240, respectively. In an embodiment, the coordinate warping unit 110 warps the shared coordinate map according to the transformation parameters 155 to produce the correspondence map 160.

At step 245, the image is synthesized, by a modulated generator using generator parameters, according to the correspondence map and an encoded texture. In an embodiment, the modulated generator, the generator parameters, and the encoded texture comprise the modulated generator 120 or 220, the generator parameters 165, and the encoded image texture 150, respectively. In an embodiment, an object in the image comprises appearance details according to the encoded texture and component shapes controlled by the encoded structure. In an embodiment, the correspondence map is converted for processing by the modulated generator using a Fourier embedding. In an embodiment, the modulated generator comprises a sequence of processing layers and the correspondence map is directly combined with features output by one or more of the processing layers.

In an embodiment, a loss is computed based on differences between a set of images produced for the encoded structure and different values of the encoded texture and the transformation parameters and the generator parameters are updated based on the loss to reduce the differences. In an embodiment, the loss is computed by the loss function unit 205. In an embodiment, a loss is computed based on differences between a set of images produced for different values of the encoded structure and the encoded texture and the transformation parameters and the generator parameters are updated based on the loss to reduce the differences.

In an embodiment, the image is warped from the image to an additional image to produce a warped image, according to a transformation. In an embodiment, the additional image is synthesized, by the modulated generator, using a second encoded structure and a second encoded texture. In an embodiment, a second image is synthesized by the modulated generator using the second encoded structure and the encoded texture. In an embodiment, a warping loss is computed based on differences between the warped image and the second image and the transformation parameters and the generator parameters are updated based on the warping loss to reduce the differences.

An encoder may be used with the correspondence generation system 100 to enable propagation of semantic labels from a reference image to the synthesized images. In an embodiment, the reference image is a real image. The propagation enables automatic generation of labeled synthesized images.

Figure 3A:
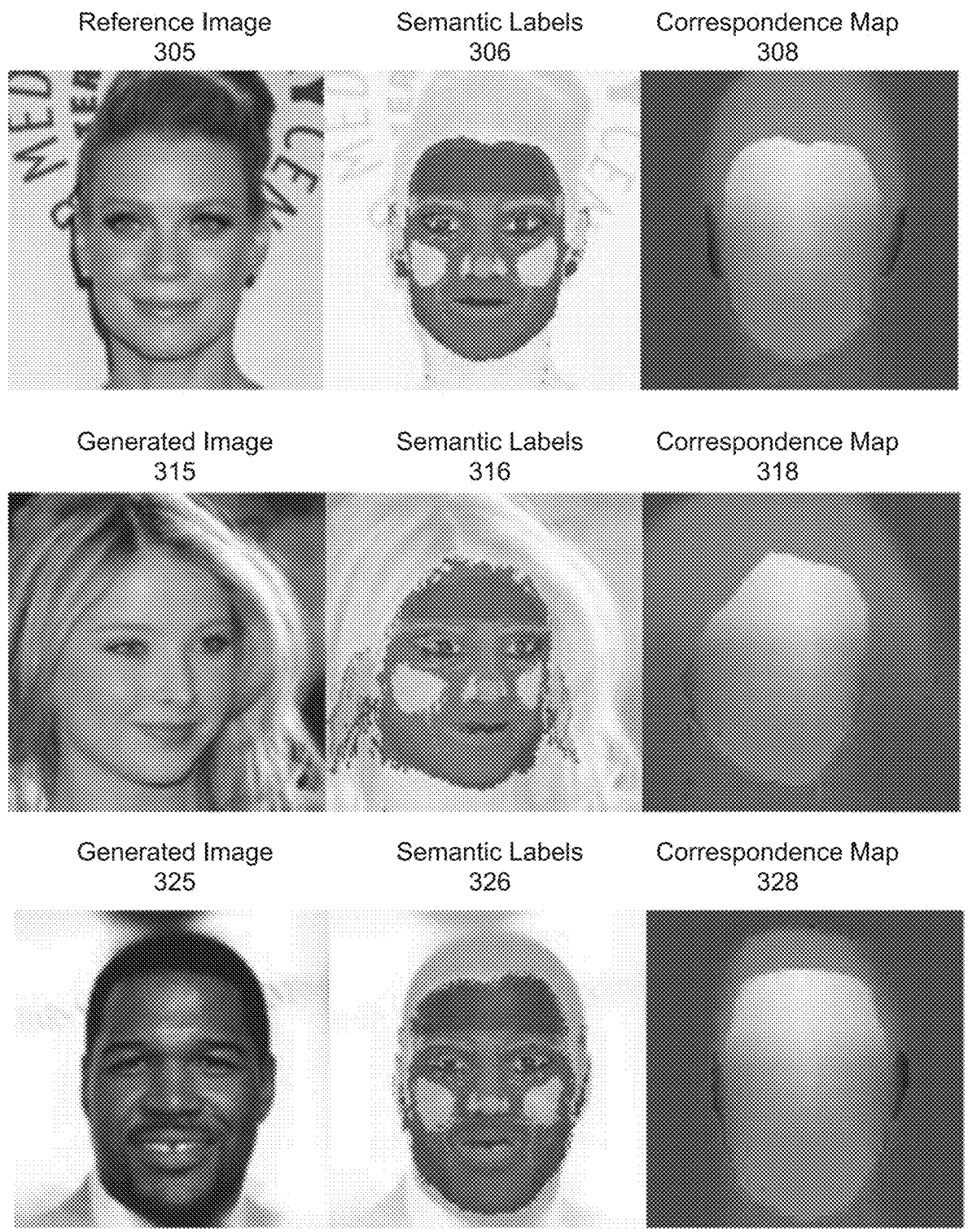
FIG. 3A illustrates sematic labels propagated by a correspondence generation system, in accordance with an embodiment.

FIG. 3A illustrates sematic labels propagated by a correspondence generation system, in accordance with an embodiment. Given one reference image 305 with semantic labels 306, a correspondence map 308 is first inferred with the trained encoder. The encoder thereby establishes a mapping between the semantic labels 306 and the correspondence map 308 for the reference image 305. For visualization purposes only, a ground truth segmentation mask is applied to highlight foreground areas of the predicted correspondence map 308.

A second correspondence map 318 is then inferred for a (query) generated image 315 and the semantic labels 306 provided for the reference image 305 are propagated using Equation (1) to the produce semantic labels 316. Similarly, a third correspondence map 328 is inferred for a generated image 325 and the semantic labels 306 provided for the reference image 305 are propagated to the produce semantic labels 326. Note that the sematic labels are accurately propagated even when a pose of the subject in the generated image 315 differs from the pose in the reference image 305 (e.g., frontal vs profile pose). For visualization purposes only, ground truth segmentation masks are applied to highlight the foreground areas of the predicted correspondence maps 318 and 328. Importantly, the ground truth segmentation masks (which are not ordinarily available for the generated images) are not used for the label propagation.

Figure 3B:
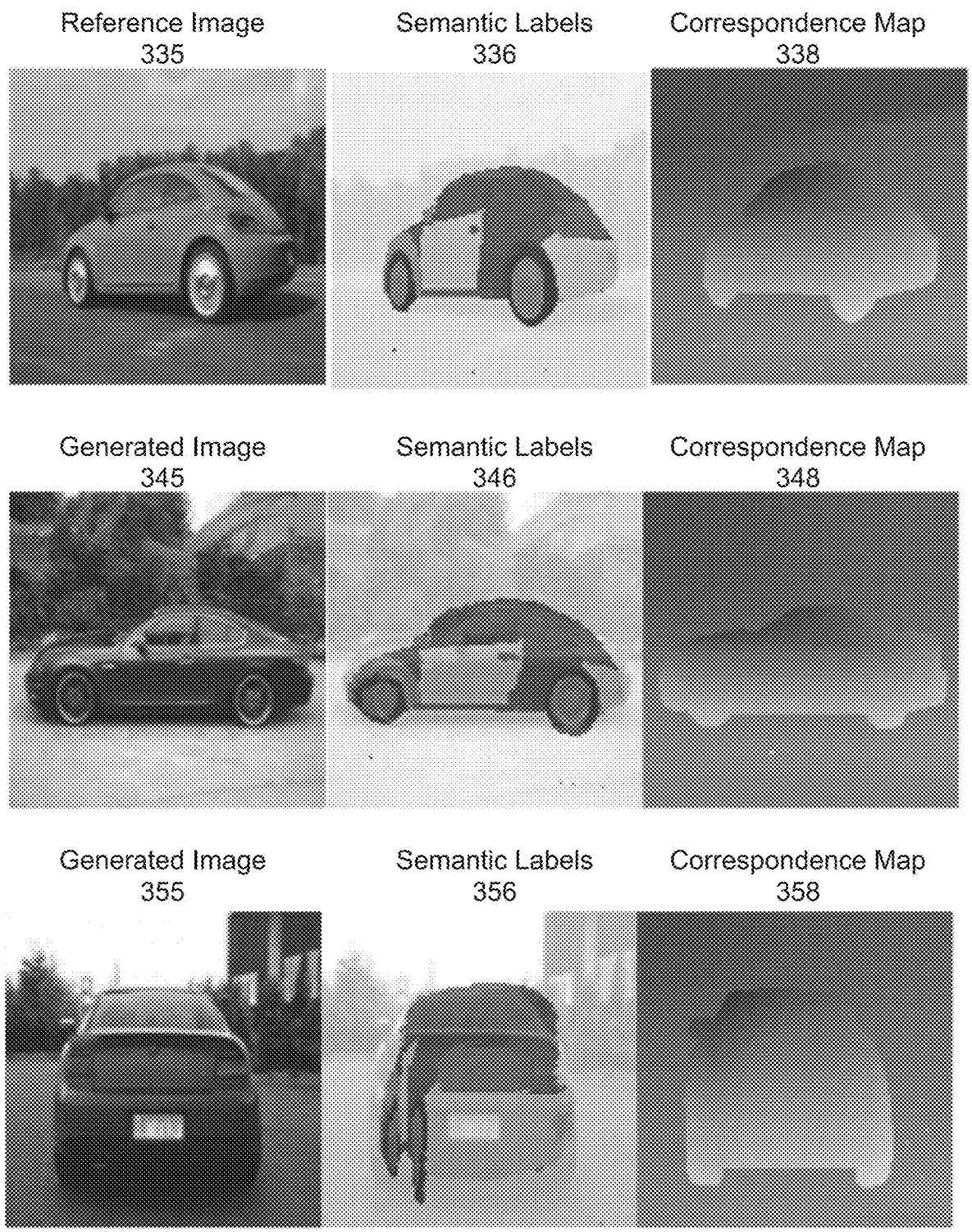
FIG. 3B also illustrates sematic labels propagated by a correspondence generation system, in accordance with an embodiment.

FIG. 3B also illustrates sematic labels propagated by a correspondence generation system, in accordance with an embodiment. Compared with faces, propagation of labels for objects, such as cars may be more challenging considering differences in viewpoints and scales. The encoder thereby establishes a mapping between the semantic labels 336 and the correspondence map 338 for the reference image 335. For visualization purposes only a ground truth segmentation mask is applied to highlight foreground areas of the predicted correspondence map 338. A second correspondence map 338 is inferred for a (query) generated image 345 and the semantic labels 336 provided for the reference image 335 are propagated using Equation (1) to the produce semantic labels 346. Similarly, a third correspondence map 358 is inferred for a generated image 355 and the semantic labels 336 provided for the reference image 335 are propagated to the produce semantic labels 356. For visualization purposes only ground truth segmentation masks are applied to highlight the foreground areas of the predicted correspondence maps 348 and 348. Importantly, the ground truth segmentation masks (which are not ordinarily available for the generated images) are not used for the label propagation.

Figure 3C:
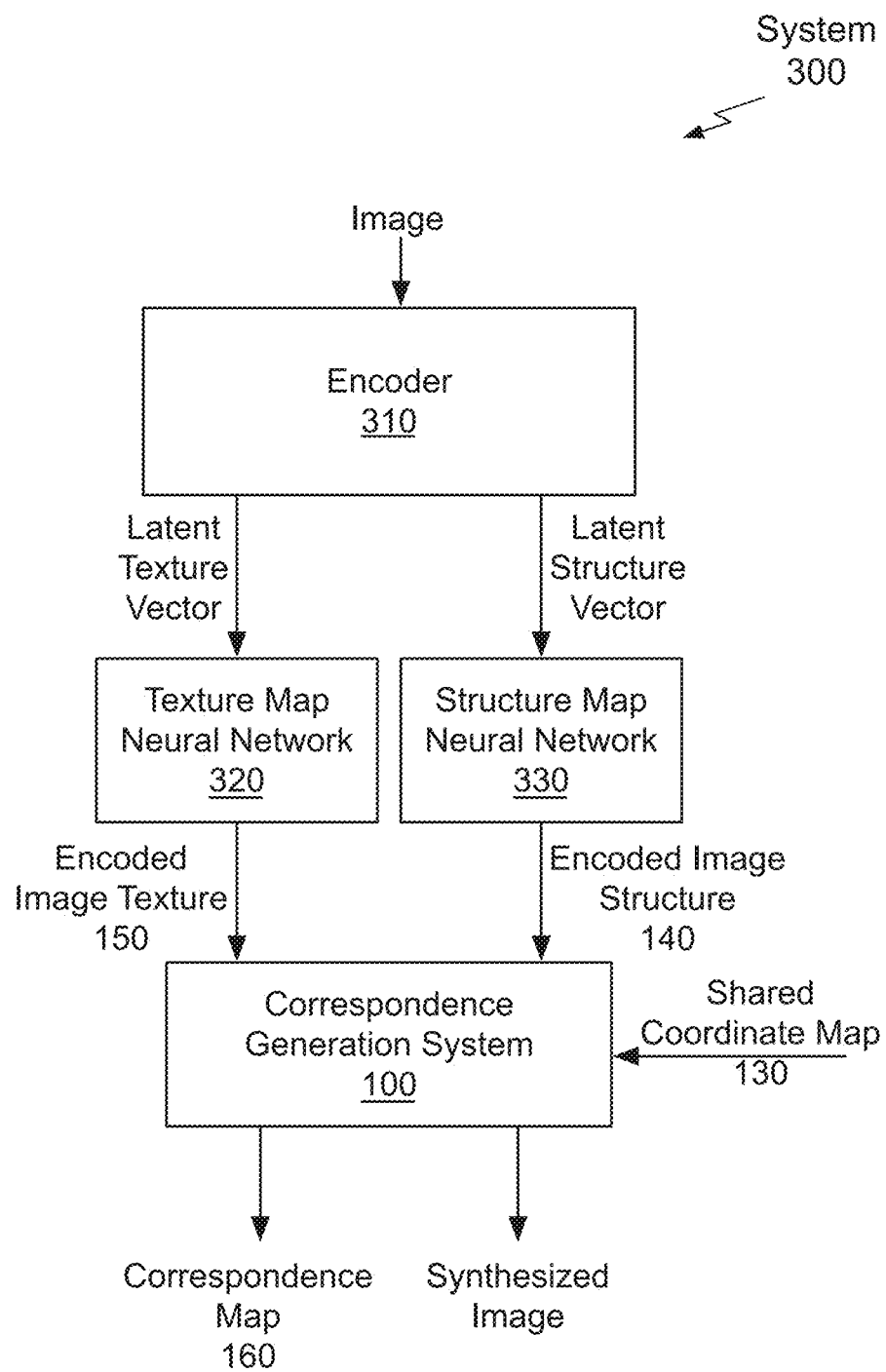
FIG. 3C illustrates a block diagram of another example correspondence generation system suitable for use in implementing some embodiments of the present disclosure.

FIG. 3C illustrates a block diagram of another example correspondence generation system 300 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the correspondence generation system 300 is within the scope and spirit of embodiments of the present disclosure.

The correspondence generation system 300 includes the correspondence generation system 100, an encoder 310, a texture map neural network 320, and a structure map neural network 330. In an embodiment, the texture map neural network 320 and the structure map neural network 330 are jointly trained with the correspondence generation system 100. In an embodiment, the correspondence generation system 300 may be trained using a configuration similar to the correspondence generation system training configuration 200. The learned parameters for the texture map neural network 320, the structure map neural network 330, and the correspondence generation system 100 are then fixed (held constant) while encoding parameters of the encoder 310 are learned using real images and the synthesized images.

In an embodiment, the encoding parameters are learned using at least a latent consistency loss that reduces differences between the encoded image textures 150 and encoded image structures 140 associated with the synthesized images and the encoded image textures 150 and encoded image structures 140, respectively, that are produced from the latent texture and structure vectors generated by the encoder 310 when the synthesized images are input to the encoder 310. In an embodiment, a reconstruction loss and/or a swap loss are also used for training the encoder 310. Once the encoder 310 is also trained, semantic labels may be automatically propagated to synthesized images (for each category of object). A single labeled reference image is processed to generate a reference correspondence map for the semantic labels. The reference correspondence map 160 may then be used along with the correspondence map 160 generated for each synthesized image to transfer the semantic labels to the synthesized image (via Equation 1). Other use cases include texture swapping and structure swapping.

Combining the encoder 310 with the correspondence generation system 100 along with the texture map neural network 320 and the structure map neural network 330 enables the extraction of dense correspondence from real images. Specifically, an encoder $E(\bullet;\theta_E)$ parameterized by $\theta_E$ is introduced to map an image x to a pair of structure $w_{s,E}$ and texture $w_{t,E}$ latent codes (e.g., latent texture and latent structure vectors). The latent texture and latent structure vectors are then mapped to the encoded image texture 150 and structure 140, respectively, and input to the correspondence generation system 100 to synthesize a replica of the image. Embedding real images directly into W+ space rather than W space typically results in better reconstruction. Therefore, in an embodiment, the encoder 310 outputs latent texture vectors $w_{t,E}^+$ in W+ space as opposed to encoding $w_{t,E}^+$ in W space. During training, the modulated generator 120 may be fixed (i.e., the generator parameters 165 may be held constant) while the encoder parameters are optimized via latent consistency, reconstruction, and/or texture swapping losses.

The latent consistency loss may be introduced by feeding synthesized images back into the encoder 310 and matching the distribution of outputs produced by the encoder 310 to that originally produced by the correspondence generation system 100. Suppose an image is synthesized with encoded image texture 150 $w_t$, the encoded image structure 140 $w_s$, and the correspondence map 160 $C^w$. Inputting the synthesized image back into the encoder 310 produces the encoded image texture 150 $w_{t,E}^+$ and the encoded image structure 140 $w_{s,E}$, and the correspondence map 160 $C_E$. The latent consistency loss $\mathcal{L}_{con}$ is defined as $$\mathcal{L}_{con}=\mathcal{L}_2(w_s,w_{s,E})+\mathcal{L}_2(C^w,C_E^w), \qquad \text{Eq. (9)}$$

where $\mathcal{L}_2(\bullet,\bullet)$ denotes the $\mathcal{L}_2$ loss.

The reconstruction loss for input real images, with L1 ($\mathcal{L}_1$) and LPIPS ($\mathcal{L}_{LPIPS}$) components, may be defined as $$\mathcal{L}_{rec}=\mathcal{L}_1(x,G(E(x)))+\mathcal{L}_{LPIPS}(x,G(E(x))), \qquad \text{Eq. (10)}$$

The overall learning objective $\mathcal{L}_E$ used for training the encoder 310 may be $$\mathcal{L}_E=\lambda_{con}*\mathcal{L}_{con}+\lambda_{rec}*\mathcal{L}_{rec}+\lambda_t*\mathcal{L}_t, \qquad \text{Eq. (11)}$$

where $\lambda_{con}$, $\lambda_{rec}$, and $\lambda_t$ are hyperparameters that balance the different losses.

Note that the encoder 310 facilitates explicit structure representation learning for real images. It is significantly more efficient than conventional optimization-based GAN-inversion methods, as no iterative inference is required. In an embodiment, the encoder 310 maps, according to the encoder parameters, the image to a latent texture vector corresponding to an additional encoded (image) texture 150 and a latent structure vector corresponding to an additional encoded (image) structure 140. In an embodiment, an additional synthesized image and additional correspondence map 160 are generated using the additional encoded image structure 140 and the additional encoded image texture 150. In an embodiment, the encoder parameters are updated to reduce differences between the correspondence map 160 and the additional correspondence map 160 and between the encoded image structure 140 and the additional encoded image structure 140. In an embodiment, the encoder parameters are updated to reduce the latent consistency loss. In an embodiment, the generator parameters 165 are updated to reduce differences between the additional image and the image. In an embodiment, the encoder parameters are updated to reduce the reconstruction loss.

In an embodiment, the encoder 310 maps a reference image including semantic labels to produce a reference encoded image texture 150 and a reference encoded image structure 140 and the shared coordinate map 130 is warped to align with the reference encoded image structure 140 according to the transformation parameters 155 to produce a correspondence map 160 for the reference image. In an embodiment, the shared coordinate map 130 is warped to align with an additional encoded image structure 140 according to the transformation parameters 155 to produce an additional correspondence map 160 for an additional image and the semantic labels are propagated to the additional image according to a transform between the reference correspondence map 160 and the additional correspondence map 160.

The correspondence generation system 100 exploits the inherent ability of a GAN to vary the structure within synthesized images according to a latent code. The correspondence generation system 100 can be trained to explicitly learn pixel-level correspondences by decoupling control of the structure and the texture during image synthesis. An encoder 310 may be combined with the correspondence generation system 100 to perform tasks such as automatic semantic label propagation, texture swapping, and structure swapping.

Figure 3D:
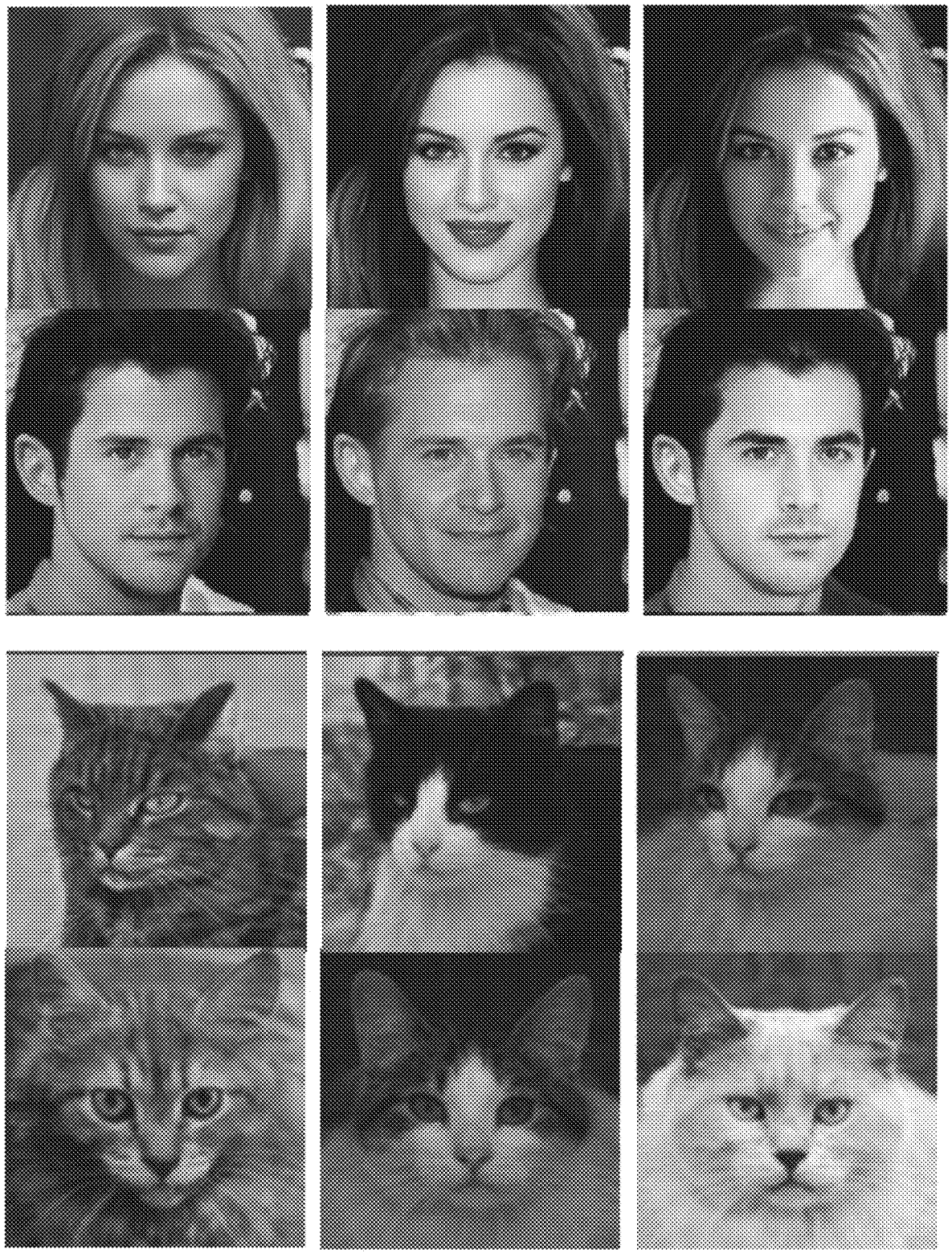
FIG. 3D illustrates texture swapping performed by the correspondence generation system, in accordance with an embodiment.

FIG. 3D illustrates identity-preserving texture swapping performed by the correspondence generation system 100, in accordance with an embodiment. Texture swapping generates images with the same structure code (latent structure vector or encoded image structure 140) but different texture codes (latent texture vectors or encoded image textures 150). FIG. 3D illustrates, from top to bottom, synthesized images of the correspondence generation system 100 trained using separate datasets (CelebAMask-HQ and AFHQcat). Synthesized images shown in each row are generated with the same structure code and diverse texture codes. The disentanglement of structure and texture by the correspondence generation system 100 may be analyzed during texture swapping by evaluating the structural consistency of the synthesized images. It is apparent that the correspondence generation system 100 preserves structure when only texture codes are modified.

Figure 3E:
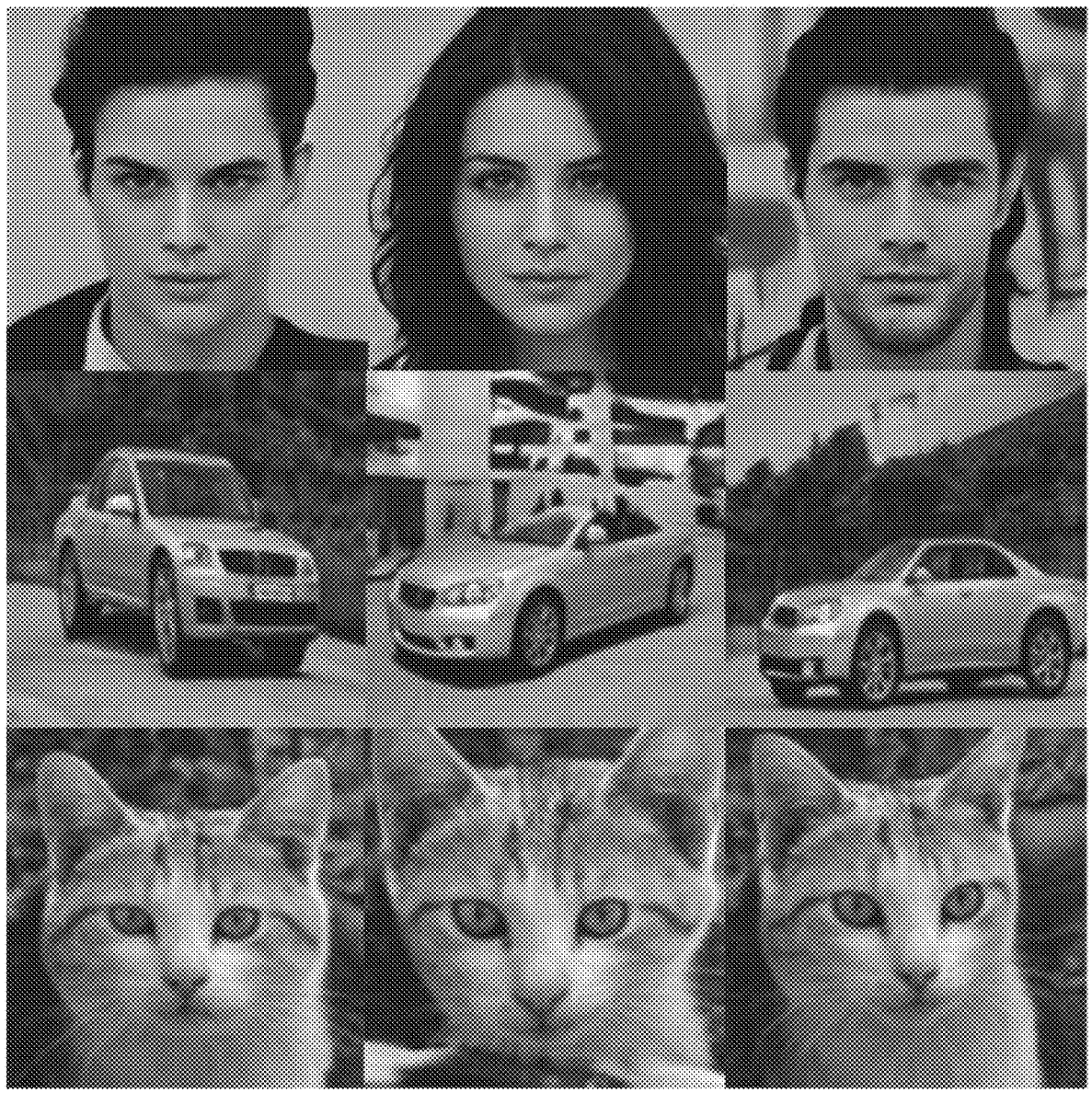
FIG. 3E illustrates structural swapping performed by the correspondence generation system, in accordance with an embodiment.

FIG. 3E illustrates structural swapping performed by the correspondence generation system 100, in accordance with an embodiment. Structure swapping synthesizes images of the same texture code and various structure codes. FIG. 3E illustrates from top to bottom, synthesized images of models trained using separate datasets (CelebAMask-HQ, Stanford Cars, and AFHQcat). Images shown in each row are generated with the same texture code and diverse structure codes. The synthesized images in each row show similar textures (e.g., hair/face colors for humans, grey cars, patterned cats) with diverse structural variations (e.g., viewpoint, scale, shape, layout, etc). The synthesized images confirm that the correspondence generation system 100 learns a disentangled representation where the structure code and the texture code capture different attributes of each synthesized image.

Parallel Processing Architecture

Figure 4:
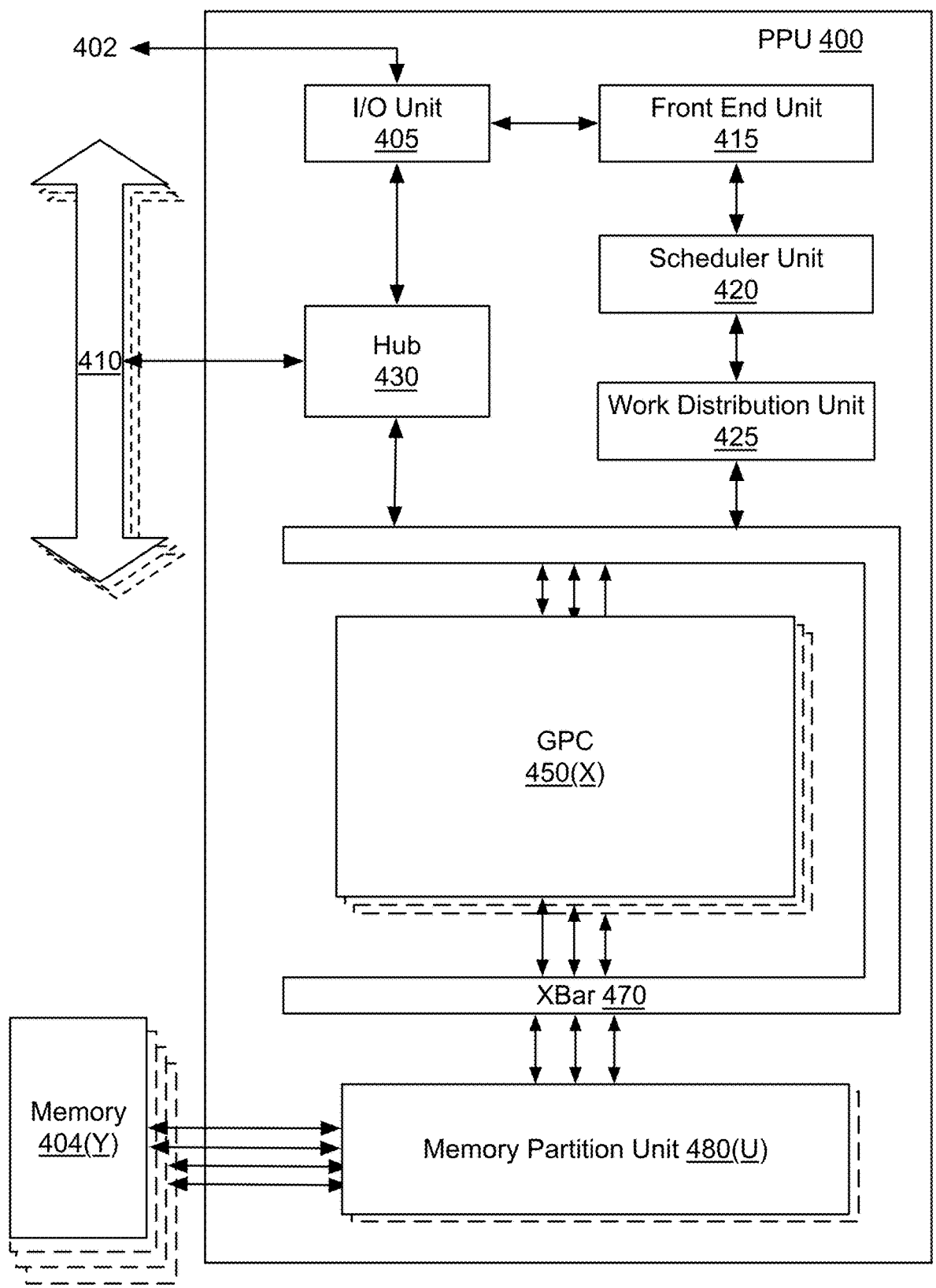
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the correspondence generation system 100, the correspondence generation system training configuration 200, and/or the system 300. The PPU 400 may be used to implement one or more of the encoder 310, texture map neural network 320, structure map neural network 330, loss function unit 205, coordinate warping unit 110, coordinate warping unit 210, modulated generator 120, and modulated generator 220. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
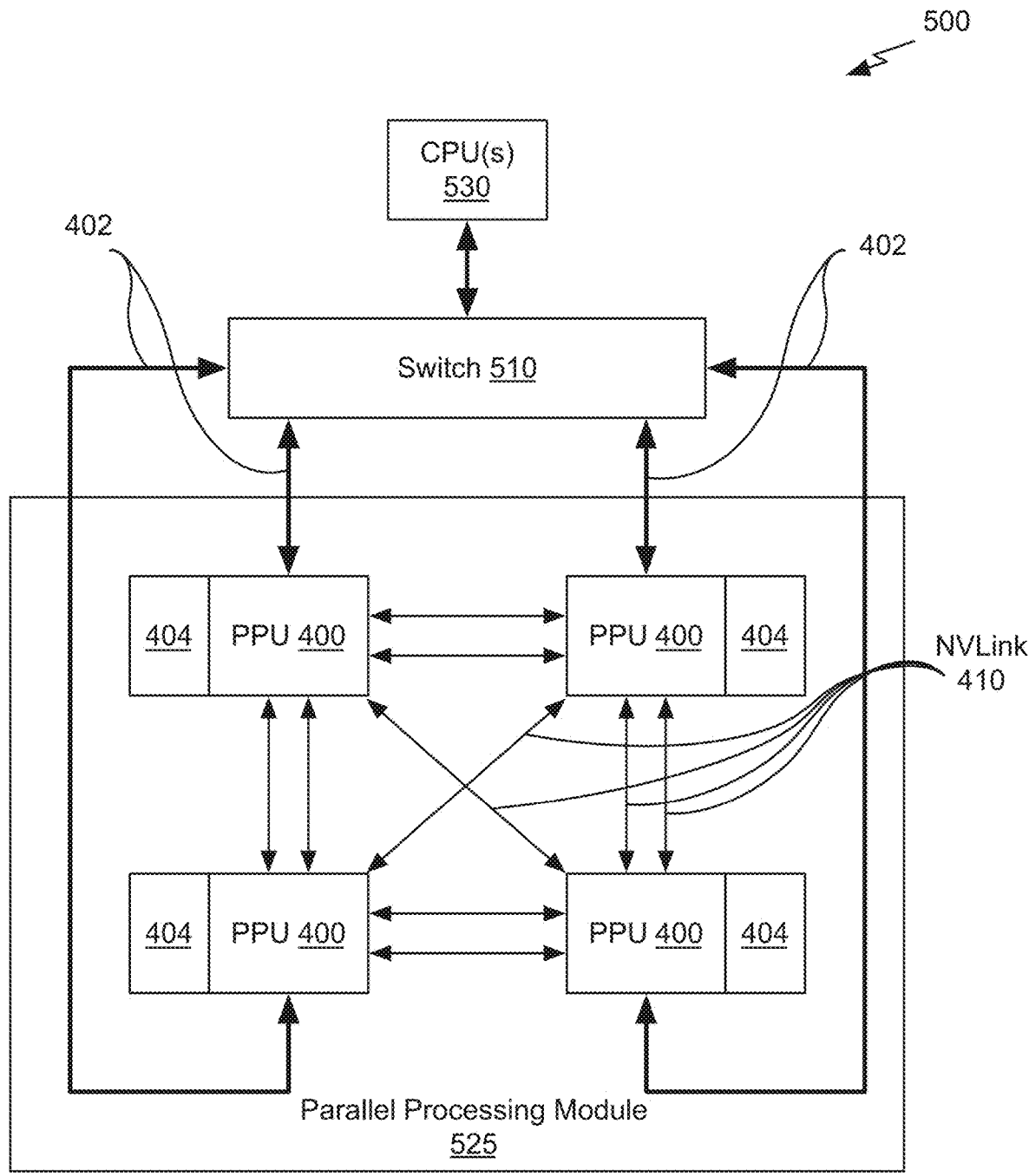
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 225 shown in FIG. 2B. The processing system 500 includes a CPU 530, switch 510, and multiple PPUs 400, and respective memories 404.

Figure 5B:
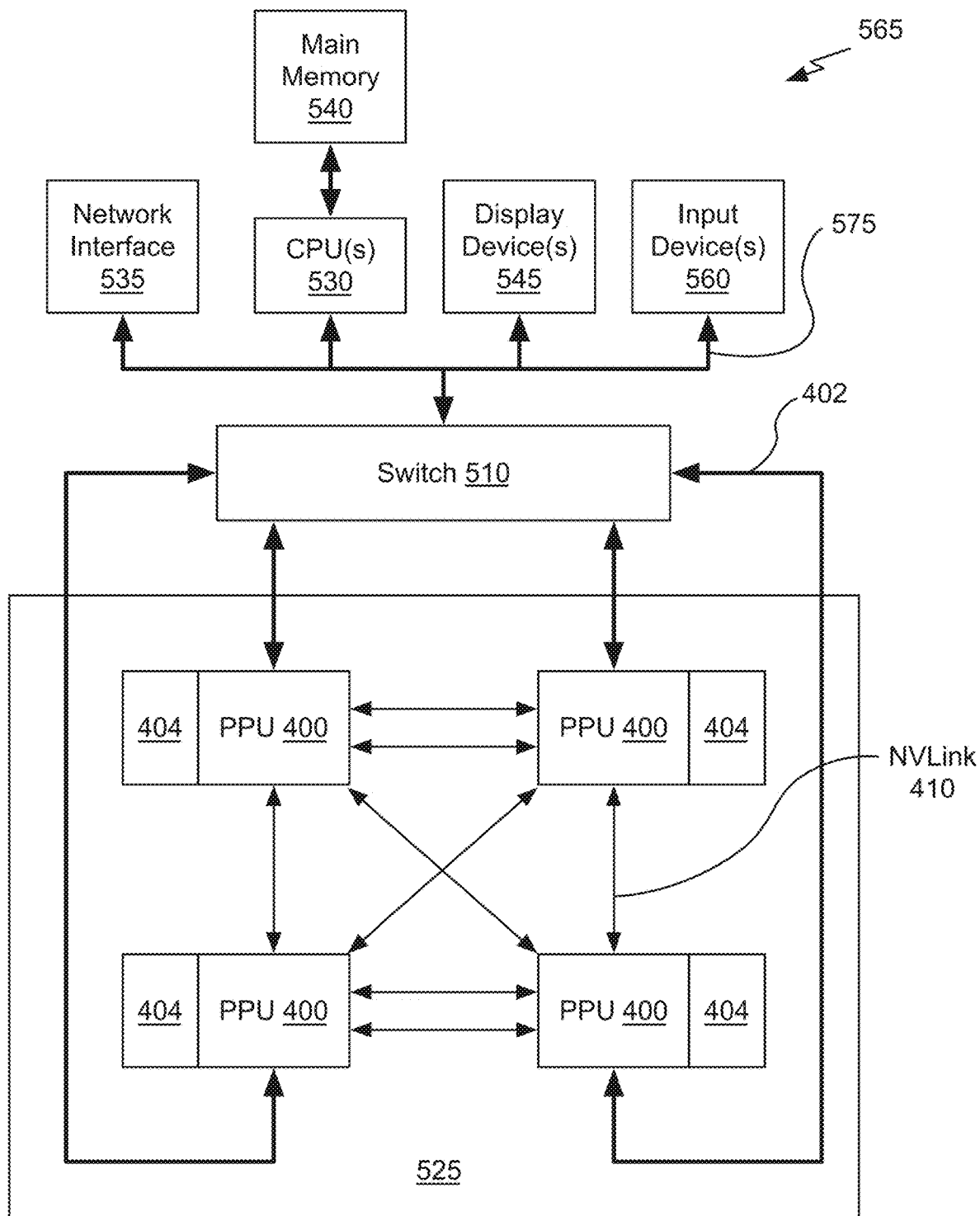
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530.

The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 225 shown in FIG. 2B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
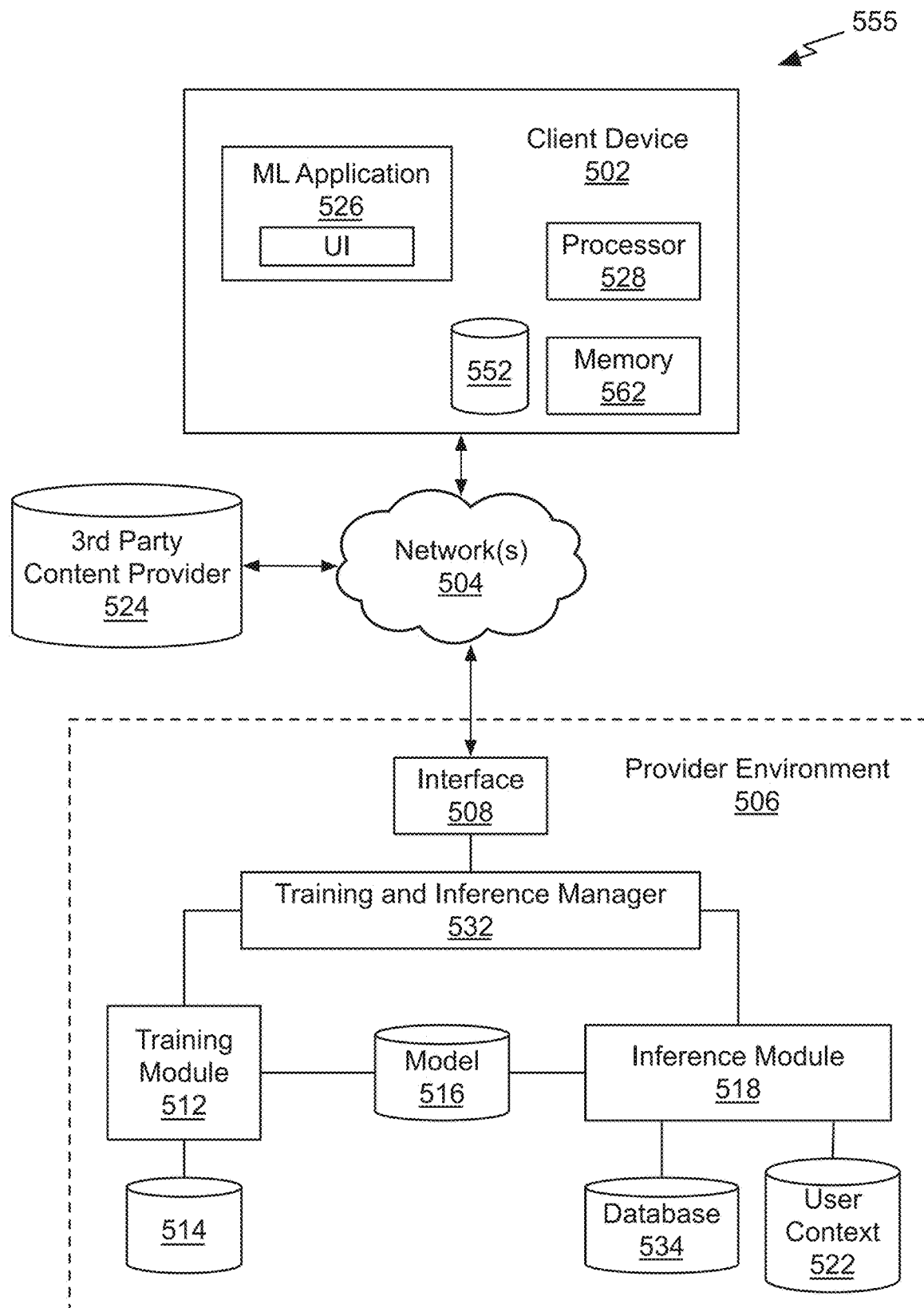
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in the correspondence generation system training configuration 200 to train the correspondence generation system.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Example Streaming System

Figure 6:
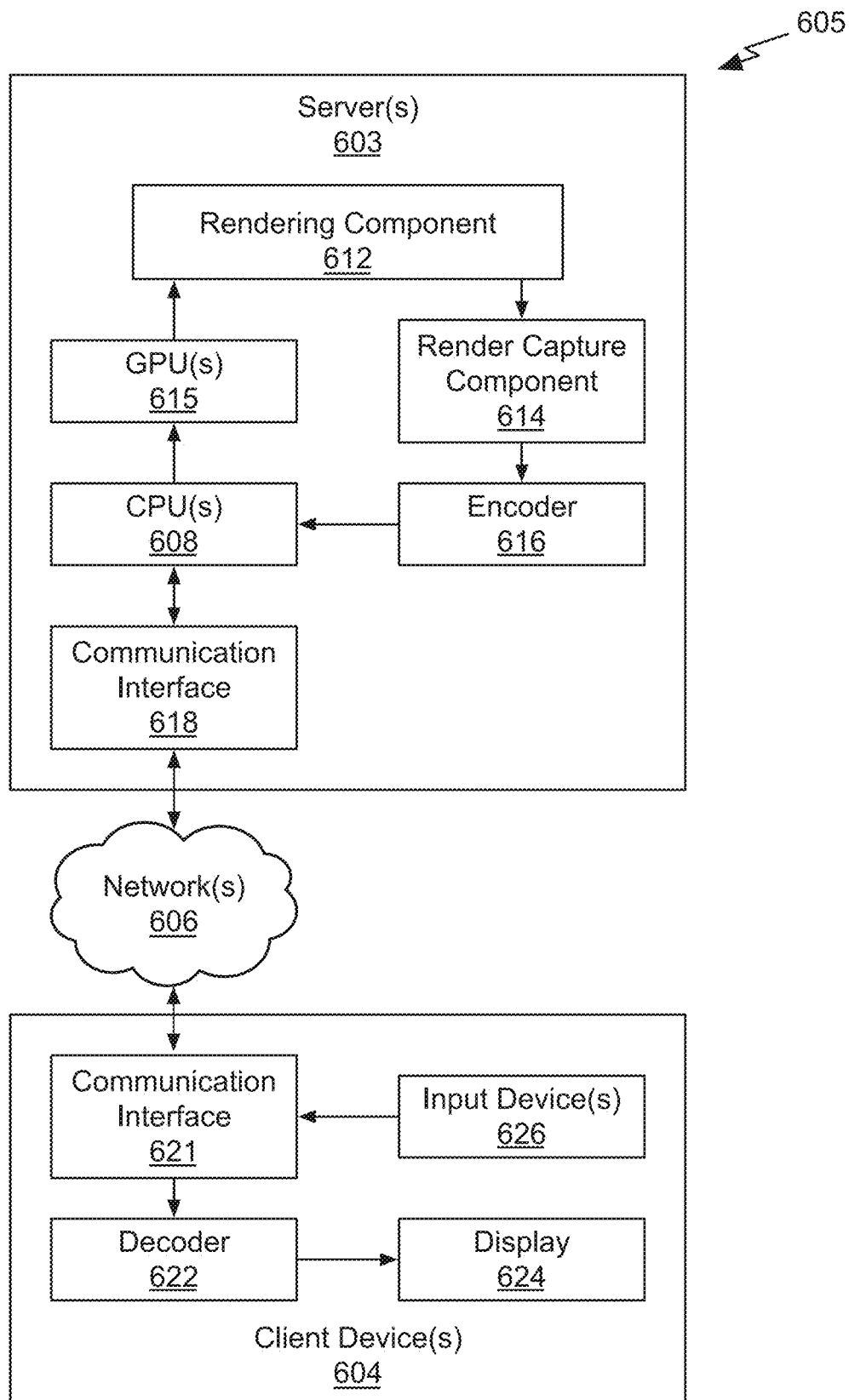
FIG. 6 illustrates an exemplary streaming system suitable for use in implementing some embodiments of the present disclosure.

FIG. 6B is an example system diagram for a streaming system 605, in accordance with some embodiments of the present disclosure. FIG. 6B includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method of generating correspondences for images, comprising:
   warping a shared coordinate map, according to transformation parameters, to align with an encoded structure to produce a correspondence map for an image; and
   synthesizing, by a modulated generator comprising a sequence of processing layers and using generator parameters, the image according to the correspondence map and an encoded texture, wherein the correspondence map is directly combined with features output by one or more of the processing layers and an object in the image comprises appearance details according to the encoded texture and component shapes controlled by the encoded structure.

2. The method of claim 1, further comprising:
   computing a loss based on differences between a set of images produced for different values of the encoded structure and the encoded texture; and
   updating the transformation parameters and the generator parameters based on the loss to reduce the differences.

3. The computer-implemented method of claim 1, wherein at least one of the steps of warping and synthesizing are performed on a server or in a data center to generate an image.

4. The computer-implemented method of claim 1, wherein at least one of the steps of warping and synthesizing are performed within a cloud computing environment.

5. The computer-implemented method of claim 1, wherein at least one of the steps of warping and synthesizing are performed for training, testing, or certifying a neural network employed in a machine, robot, or autonomous vehicle.

6. The computer-implemented method of claim 1, wherein at least one of the steps of warping and synthesizing is performed on a virtual machine comprising a portion of a graphics processing unit.

7. A method of generating correspondences for images comprising:
   warping a shared coordinate map, according to transformation parameters, to align with an encoded structure to produce a correspondence map for an image;
   synthesizing, by a modulated generator using generator parameters, the image according to the correspondence map and an encoded texture, wherein an object in the image comprises appearance details according to the encoded texture and component shapes controlled by the encoded structure;
   computing a loss based on differences between a set of images produced for the encoded structure and different values of the encoded texture; and
   updating the transformation parameters and the generator parameters based on the loss to reduce the differences.

8. A method of generating correspondences for images comprising:
   warping a shared coordinate map, according to transformation parameters, to align with an encoded structure to produce a correspondence map for an image;
   synthesizing, by a modulated generator using generator parameters, the image according to the correspondence map and an encoded texture, wherein an object in the image comprises appearance details according to the encoded texture and component shapes controlled by the encoded structure;
   warping the image according to a transformation from the image to an additional image to produce a warped image, wherein the additional image is synthesized, by the modulated generator, using a second encoded structure and a second encoded texture;
   synthesizing a second image by the modulated generator using the second encoded structure and the encoded texture;
   computing a warping loss based on differences between the warped image and the second image; and
   updating the transformation parameters and the generator parameters based on the warping loss to reduce the differences.

9. A method of generating correspondences for images comprising:
   warping a shared coordinate map, according to transformation parameters, to align with an encoded structure to produce a correspondence map for an image;
   synthesizing, by a modulated generator using generator parameters, the image according to the correspondence map and an encoded texture, wherein an object in the image comprises appearance details according to the encoded texture and component shapes controlled by the encoded structure; and
   converting the correspondence map for processing by the modulated generator using a Fourier embedding.

10. The method of claim 9, wherein the modulated generator comprises a sequence of processing layers and the correspondence map is directly combined with features output by one or more of the processing layers.

11. A method of generating correspondences for images comprising:
    warping a shared coordinate map, according to transformation parameters, to align with an encoded structure to produce a correspondence map for an image;
    synthesizing, by a modulated generator using generator parameters, the image according to the correspondence map and an encoded texture, wherein an object in the image comprises appearance details according to the encoded texture and component shapes controlled by the encoded structure; and
    an encoder that maps, according to encoder parameters, the image to a latent texture vector corresponding to an additional encoded texture and a latent structure vector corresponding to an additional encoded structure.

12. The method of claim 11, further comprising:
    generating an additional image for the additional encoded texture and the additional encoded structure; and
    updating the encoder parameters to reduce differences between the additional image and the image.

13. The method of claim 11, further comprising:
    updating the encoder parameters to reduce differences between the encoded structure and the additional encoded structure;
    generating an additional correspondence map for the additional encoded texture and the additional encoded structure; and
    updating the encoder parameters to reduce differences between the correspondence map and the additional correspondence map.

14. A method of generating correspondences for images comprising:
- warping a shared coordinate map, according to transformation parameters, to align with an encoded structure to produce a correspondence map for an image;
- synthesizing, by a modulated generator using generator parameters, the image according to the correspondence map and an encoded texture, wherein an object in the image comprises appearance details according to the encoded texture and component shapes controlled by the encoded structure;
- mapping, by an encoder, a reference image including semantic labels to produce a reference encoded texture and a reference encoded structure; and
- warping the shared coordinate map to align with the reference encoded structure according to the transformation parameters to produce a correspondence map for the reference image.

15. The method of claim 14, further comprising:
- warping the shared coordinate map to align with an additional encoded structure according to the transformation parameters to produce an additional correspondence map for an additional image; and
- propagating the semantic labels to the additional image according to a transform between the reference correspondence map and the additional correspondence map.

16. A system, comprising:
- a memory that stores transformation parameters and generator parameters; and
- a processor that is connected to the memory and configured to generate correspondences for images by:
  - warping a shared coordinate map, according to the transformation parameters, to align with an encoded structure to produce a correspondence map for an image; and
  - synthesizing, by a modulated generator comprising a sequence of processing layers and using the generator parameters, the image according to the correspondence map and an encoded texture, wherein the correspondence map is directly combined with features output by one or more of the processing layers and an object in the image comprises appearance details according to the encoded texture and component shapes controlled by the encoded structure.

17. A system, comprising:
- a memory that stores transformation parameters and generator parameters; and
- a processor that is connected to the memory and configured to generate correspondences for images by:
  - warping a shared coordinate map, according to the transformation parameters, to align with an encoded structure to produce a correspondence map for an image;
  - synthesizing, using the generator parameters, the image according to the correspondence map and an encoded texture, wherein an object in the image comprises appearance details according to the encoded texture and component shapes controlled by the encoded structure;
  - computing a loss based on differences between a set of images produced for the encoded structure and different values of the encoded texture; and
  - updating the transformation parameters and the generator parameters based on the loss to reduce the differences.

18. The system of claim 1, wherein the processor is further configured to synthesize the image using a modulated generator that comprises a sequence of processing layers and the correspondence map is directly combined with features output by one or more of the processing layers.

19. A non-transitory computer-readable media storing computer instructions for generating correspondences for images that, when executed by one or more processors, cause the one or more processors to perform the steps of:
- warping a shared coordinate map, according to transformation parameters, to align with an encoded structure to produce a correspondence map for an image; and
- synthesizing, by a modulated generator comprising a sequence of processing layers and using generator parameters, the image according to the correspondence map and an encoded texture, wherein the correspondence map is directly combined with features output by one or more of the processing layers and an object in the image comprises appearance details according to the encoded texture and component shapes controlled by the encoded structure.

20. A non-transitory computer-readable media storing computer instructions for generating correspondences for images that, when executed by one or more processors, cause the one or more processors to perform the steps of:
- warping a shared coordinate map, according to transformation parameters, to align with an encoded structure to produce a correspondence map for an image;
- synthesizing, using generator parameters, the image according to the correspondence map and an encoded texture, wherein an object in the image comprises appearance details according to the encoded texture and component shapes controlled by the encoded structure;
- mapping, by an encoder, a reference image including semantic labels to produce a reference encoded texture and a reference encoded structure; and
- warping the shared coordinate map to align with the reference encoded structure according to the transformation parameters to produce a correspondence map for the reference image.

* * * * *